(12) United States Patent
Wu et al.

(10) Patent No.: US 12,375,889 B2
(45) Date of Patent: Jul. 29, 2025

(54) COMMUNICATION METHOD, DEVICE, AND SYSTEM FOR OBTAINING DATA CORRESPONDING TO A GROUP TO WHICH A TERMINAL DEVICE BELONGS

(71) Applicant: Huawei Technologies Co., Ltd., Shenzhen (CN)

(72) Inventors: Yizhuang Wu, Beijing (CN); Haiyang Sun, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 365 days.

(21) Appl. No.: 18/154,490

(22) Filed: Jan. 13, 2023

(65) Prior Publication Data
US 2023/0164523 A1 May 25, 2023

Related U.S. Application Data

(63) Continuation of application No. PCT/CN2021/092438, filed on May 8, 2021.

(30) Foreign Application Priority Data

Jul. 13, 2020 (CN) .......................... 202010671484.8

(51) Int. Cl.
*H04W 4/08* (2009.01)
*H04W 8/20* (2009.01)
*H04W 60/04* (2009.01)

(52) U.S. Cl.
CPC ............... *H04W 4/08* (2013.01); *H04W 8/20* (2013.01); *H04W 60/04* (2013.01)

(58) Field of Classification Search
CPC .......... H04W 4/08; H04W 8/20; H04W 60/04
USPC ....................................................... 455/435.1
See application file for complete search history.

(56) References Cited

U.S. PATENT DOCUMENTS

| 11,923,993 | B2* | 3/2024 | Garcia Azorero | .. H04L 12/1407 |
| 12,160,448 | B2* | 12/2024 | Garcia Azorero | ...... H04L 67/02 |
| 2020/0112850 | A1* | 4/2020 | Lee | ........................ H04W 8/205 |
| 2020/0267785 | A1* | 8/2020 | Talebi Fard | ............. H04L 45/04 |
| 2021/0051005 | A1* | 2/2021 | Kunz | ..................... H04W 12/04 |

(Continued)

FOREIGN PATENT DOCUMENTS

| CN | 109951824 A | 6/2019 |
| CN | 111385851 A | 7/2020 |

(Continued)

OTHER PUBLICATIONS

Ericsson, "5G VN group management," SA WG2 Temporary Document, SA WG2 Meeting #133, May 13-17, 2019, Reno, NV, USA, S2-1905236, 3 pages.

(Continued)

*Primary Examiner* — Mark G. Pannell
(74) *Attorney, Agent, or Firm* — Slater Matsil, LLP

(57) ABSTRACT

In an embodiment a method includes receiving, by a policy control network element, first information from a first network element, wherein the first information comprises a group identifier and a data type corresponding to the group identifier, the group identifier indicating a group and the group comprising one or more terminal devices, and obtaining, by the policy control network element, first data based on the first information, wherein the first data is data corresponding to the data type.

22 Claims, 11 Drawing Sheets

(56) References Cited

U.S. PATENT DOCUMENTS

| | | | |
|---|---|---|---|
| 2021/0168584 A1* | 6/2021 | Li | H04W 60/00 |
| 2021/0329504 A1 | 10/2021 | Wu et al. | |
| 2022/0110023 A1 | 4/2022 | Wu et al. | |
| 2022/0201543 A1* | 6/2022 | Zhu | H04W 28/0925 |
| 2023/0056728 A1 | 2/2023 | Wu | |
| 2023/0094062 A1* | 3/2023 | Kim | H04W 84/02 |
| | | | 455/456.1 |
| 2023/0217241 A1* | 7/2023 | Velev | H04W 8/20 |
| | | | 455/414.1 |

FOREIGN PATENT DOCUMENTS

| | | |
|---|---|---|
| CN | 112105061 A | 12/2020 |
| WO | 2019114722 A1 | 6/2019 |
| WO | 2020029907 A1 | 2/2020 |

OTHER PUBLICATIONS

3GPP TS 23.501 V16.5.0 (Sep. 2020), "3rd Generation Partnership Project; Technical Specification Group Services and System Aspects; System architecture for the 5G System (5GS); Stage 2 (Release 16)", 441 pages.

Huawei et al., "SCP Function Update," 3GPP TSG-SA WG2 Meeting #133, May 13-17, 2019, Reno,NV, USA, 32-1905710, 14 pages.

3GPP TS 23.502 V16.5.0 (Jul. 2020), "3rd Generation Partnership Project; Technical Specification Group Services and System Aspects; Procedures for the 5G System (5GS); Stage 2 (Release 16)", 594 pages.

* cited by examiner

COMMUNICATION METHOD, DEVICE, AND SYSTEM FOR OBTAINING DATA CORRESPONDING TO A GROUP TO WHICH A TERMINAL DEVICE BELONGS

CROSS-REFERENCE TO RELATED APPLICATIONS

This application is a continuation of International Patent Application No. PCT/CN2021/092438, filed on May 8, 2021, which claims priority to Chinese Patent Application No. 202010671484.8, filed on Jul. 13, 2020. The disclosures of the aforementioned applications are hereby incorporated by reference in their entireties.

TECHNICAL FIELD

This application relates to the field of communication technologies, and in particular, to a communication method, device, and system.

BACKGROUND

In a conventional technology, after a terminal device initiates a registration request to a network, a policy control function (PCF) network element may obtain subscription policy data of the terminal device from a unified data repository (UDR) network element, or obtain subscription policy data of the terminal device locally; and generate a policy of the terminal device based on the obtained data. The policy herein may be a policy used by the terminal device to set up, modify, delete, or select a protocol data unit (PDU) session, a policy used to control a PDU session of the terminal device, a policy used for access and mobility management of the terminal device, or the like.

In a 5th generation mobile communication technology (5G), a network supports control and management of a group of terminal devices. For example, the network may allocate an internal group identifier to the group of terminal devices, and use the internal group identifier to manage and control the group of terminal devices. Further, a third party may use an external group identifier to identify the group of terminal devices, and use the external group identifier to interact with the network, to obtain control over the group or negotiate with the network about data for controlling the group. The internal group identifier identifies a group of terminal devices or a group of users in a carrier network. The external group identifier identifies a group of terminal devices or a group of users in the third party.

When the carrier network or the third party configures policy related data according to groups, the policy related data may be stored in a UDR based on different data types. For example, the policy related data may be of an application data type and stored in the UDR in a group management manner, or may be of a subscription data type and stored in the UDR in a group management manner. In this case, when a terminal device registers with the network, according to an existing mechanism, a PCF senses neither a group to which the terminal device belongs nor a data type corresponding to group data. Consequently, the PCF obtains subscription related data of the terminal device from the UDR based only on an identifier of the terminal device. It can be learned that although data stored in the UDR is sufficient, data obtained by the PCF is limited.

SUMMARY

Embodiments of this application provide a communication method, device, and system, so that a PCF accurately obtains data corresponding to a group to which a terminal device belongs, to further generate a policy of the terminal device.

According to a first aspect, a first communication method is provided. For example, the method is performed by a policy control network element, or is performed by a chip that can implement a function of a policy control network element. In a 5G system, the policy control network element is, for example, a PCF. The method includes: receiving first information from a first network element, where the first information includes a group identifier and a data type corresponding to the group identifier, the group identifier indicates a group, and the group includes one or more terminal devices; and obtaining first data based on the first information, where the first data is data corresponding to the data type.

In this embodiment of this application, the policy control network element can obtain a group identifier and a data type corresponding to the group identifier, so that the policy control network element can request data corresponding to the data type. The data type corresponds to the group identifier, that is, corresponds to a group indicated by the group identifier. Therefore, the data type is applicable to one or more terminal devices included in the group. By using this solution, it can be ensured that the policy control network element can accurately obtain data corresponding to the group to which the terminal devices belong. Further, if another terminal device subsequently initiates registration, and the terminal device also belongs to the group, the policy control network element does not need to request to obtain the data corresponding to the data type again. This simplifies an operation of the policy control network element, and reduces power consumption of the policy control network element.

In a possible implementation, the first network element is a mobility management network element, and the receiving first information from a first network element includes receiving the first information from the mobility management network element.

If a terminal device initiates a registration request message, the mobility management network element needs to obtain subscription information of the terminal device from a data management network element. In this case, in this embodiment of this application, the group identifier and the data type corresponding to the group identifier may be stored in the data management network element, so that the data management network element can send both the group identifier and the data type corresponding to the group identifier to the mobility management network element when sending the subscription information of the terminal device to the mobility management network element, and the mobility management network element does not need to obtain the first information in another step. This simplifies an information exchange process, and reduces signaling overheads. The mobility management network element may send the first information to the policy control network element, so that the policy control network element can also obtain the first information when obtaining the subscription information of the terminal device, and does not need to obtain the first information in an additional step. This further reduces signaling overheads.

In a possible implementation, the first network element is a database storage network element, and the receiving first information from a first network element includes receiving the first information from the database storage network element.

Alternatively, the group identifier and the data type corresponding to the group identifier may not be stored in a data management network element, but stored in the database storage network element. The database storage network element is a network element configured to store information. The group identifier and the data type corresponding to the group identifier are stored in the database storage network element, which is more conducive to unified management of the information.

In a possible implementation, the receiving the first information from the database storage network element includes:
  sending a first request message to the database storage network element, where the first request message requests to obtain subscription information of a first terminal device; and
  receiving the first information from the database network element, where the first terminal device belongs to the group.

If the group identifier and the data type corresponding to the group identifier are stored in the database storage network element, the policy control network element may obtain the first information by sending a request to the database storage network element.

In a possible implementation, the method further includes:
  receiving a UE policy association establishment request message of the first terminal device from a mobility management network element, where the UE policy association establishment request message requests to provide policy information for the first terminal device, and the UE policy association establishment request message further includes capability information of the first terminal device.

In addition, the policy control network element further receives the UE policy association establishment request message from the mobility management network element, to establish a policy association for the first terminal device with the mobility management network element. In addition, the UE policy association establishment request message may further include the capability information of the first terminal device, so that the policy control network element can obtain a corresponding data type or generate a policy based on the capability information of the first terminal device. In this way, the obtained information better meets a requirement of the first terminal device.

In a possible implementation, the receiving the first information from the database storage network element includes receiving, from the database storage network element, the first information based on a first subscription request message, where the first subscription request message requests to subscribe to subscription information of a first terminal device, and the first information is updated subscription information of the first terminal device.

For example, the policy control network element subscribes to the subscription information of the first terminal device from the database storage network element in advance. In other words, the policy control network element subscribes to update information of the subscription information of the first terminal device from the database storage network element in advance. In this case, if the subscription information of the first terminal device is updated, the database storage network element sends the updated subscription information to the policy control network element. For example, if the updated subscription information includes the first information, the database storage network element may send the first information to the policy control network element without a request of the policy control network element. In this manner, a request process of the policy control network element is simplified. This helps reduce signaling overheads, and enables the policy control network element to obtain the updated subscription information of the first terminal device in a timely manner.

In a possible implementation, the obtaining first data based on the first information includes:
  determining a database storage network element based on the data type;
  sending a second request message to the database storage network element, where the second request message includes the group identifier, and the second request message requests to obtain the first data; and
  receiving the first data from the database storage network element.

After the policy control network element obtains a group identifier and a data type corresponding to the group identifier, for each data type, the policy control network element may determine whether the policy control network element stores data corresponding to the data type. If the policy control network element stores the data corresponding to the data type, the policy control network element may perform a corresponding operation, for example, may generate policy information corresponding to the data type. If the policy control network element does not store the data corresponding to the data type, the policy control network element needs to obtain the data corresponding to the data type. Data corresponding to different data types may be stored in different database storage network elements, and the policy control network element can know in advance a database storage network element and a data type stored in the database storage network element, that is, know which database storage network element stores a data type and which data type is stored in the database storage network element. Therefore, the policy control network element may determine a corresponding database storage network element based on the data type, and obtain data corresponding to the data type from the database storage network element.

In a possible implementation, the method further includes:
  sending a second subscription request message to the database storage network element, where the second subscription request message requests to subscribe to an update notification of the first data; and
  receiving updated first data.

To obtain the updated data of the group in a timely manner, the policy control network element may initiate subscription to the database storage network element. In this case, if group data of a subscribed group is updated subsequently, the database storage network element can actively send the updated group data to the policy control network element without a request sent by the policy control network element. This helps reduce signaling overheads.

In a possible implementation, the method further includes determining that the data corresponding to the data type is not stored.

After the policy control network element obtains a group identifier and a data type corresponding to the group identifier, for each data type, the policy control network element may determine whether the policy control network element stores data corresponding to the data type. If the policy control network element stores the data corresponding to the data type, the policy control network element does not need to obtain the data from the database storage network element again. If the policy control network element does not store the data corresponding to the data type, the policy control network element obtains the data corresponding to the data type from the database storage network element again.

In a possible implementation, the method further includes determining, based on the capability information of the first terminal device, that the first terminal device supports use of the data corresponding to the data type.

The policy control network element may determine, based on the capability information of the first terminal device, whether the first terminal device supports use of the data corresponding to the data type. If the first terminal device supports use of the data corresponding to the data type, and the policy control network element stores the data, the policy control network element may use the data to perform a corresponding operation, for example, generate policy information. Alternatively, if the first terminal device supports use of the data corresponding to the data type, and the policy control network element does not store the data, the policy control network element may obtain the data from the database storage network element. Alternatively, if the first terminal device does not support use of the data corresponding to the data type, even if the policy control network element stores the data, the policy control network element may not perform a corresponding operation. However, if the policy control network element does not store the data, the policy control network element does not need to obtain the data from the database storage network element. A reason is as follows: If the first terminal device does not support use of the data corresponding to the data type, even if the policy control network element performs corresponding processing based on the data, for example, generates policy information, the first terminal device may not be able to use the data. Therefore, the policy control network element may not need to perform processing, to reduce useless functions.

In a possible implementation, the obtaining first data based on the first information includes:
determining that the first data is locally stored; and
obtaining the first data locally.

After the policy control network element obtains a group identifier and a data type corresponding to the group identifier, for each data type, the policy control network element may determine whether the policy control network element stores data corresponding to the data type. If the policy control network element stores the data corresponding to the data type, the policy control network element may directly perform a corresponding operation, for example, may generate policy information corresponding to the data type, without obtaining the data corresponding to the data type from the database storage network element again. This simplifies an operation process of the policy control network element, and reduces signaling overheads.

In a possible implementation, the method further includes:
generating policy information based on the first data; and
sending the policy information to the first terminal device.

After obtaining the first data, the policy control network element may generate the policy information, and send the policy information to the first terminal device, so that the first terminal device can use the policy information.

In a possible implementation, the generating policy information based on the first data includes:
determining, based on the capability information of the first terminal device, that the first terminal device supports use of the data corresponding to the data type; and
generating the policy information based on the first data.

The policy control network element may determine, based on the capability information or type information of the first terminal device, whether the first terminal device supports the data type. If the policy control network element determines that the first terminal device supports the data type, the policy control network element may generate the policy information based on the data corresponding to the data type. If the policy control network element determines that the first terminal device does not support the data type, the policy control network element does not need to generate the policy information based on the data corresponding to the data type. In this manner, the policy information generated by the policy control network element can meet the requirement of the first terminal device, and there is no need to send, to the first terminal device, policy information that cannot be used by the first terminal device. This reduces transmission of redundant information, and reduces signaling overheads.

According to a second aspect, a second communication method is provided. For example, the method is performed by a mobility management network element, or is performed by a chip that can implement a function of a mobility management network element. In a 5G system, the mobility management network element is, for example, an AMF. The method includes: sending a third request message to a data management network element, where the third request message requests to obtain subscription information of a first terminal device; receiving second information from the data management network element, where the second information includes group identifiers and data types corresponding to the group identifiers, the group identifier indicates a group, and the group includes one or more terminal devices; and sending first information to a policy control network element, where the first information is a subset of the second information.

In a possible implementation, the method further includes:
receiving a registration request message from the first terminal device, where the registration request message includes capability information of the first terminal device; and
determining the subset based on the capability information of the first terminal device.

The mobility management network element may obtain a large amount of information from the data management network element. For example, the mobility management network element obtains five correspondences from the data management network element, and each of the five correspondences is a correspondence between one group identifier and one or more data types. However, it may be determined, based on the capability information of the first terminal device, that some of the data types corresponding to the five correspondences are not supported by the first terminal device. For example, a data type corresponding to one of the five correspondences is a data type 2 that is not supported by the first terminal device. In this case, the subset determined by the mobility management network element may not include the correspondence, but include only the remaining four correspondences. In this way, data types corresponding to the obtained correspondences sent to the policy control network element are all supported by the first terminal device, so that subsequent processing by the policy control network element is facilitated, and a processing result better meets a requirement of the first terminal device.

In a possible implementation, the determining the subset based on the capability information of the first terminal device includes:
determining that the first terminal device supports a data type corresponding to the subset but does not support a data type corresponding to remaining information in the second information other than the subset; and/or determining that the policy control network element requires a data type corresponding to the subset but does not require a data type corresponding to remaining information in the second information other than the subset.

The mobility management network element may determine the subset based on the capability information or type information of the first terminal device in different determining manners. For example, the subset may be determined depending on whether the first terminal device supports a corresponding data type; may be determined based on a requirement of the policy control network element; or may be determined based on results of the two determining manners. In conclusion, the determined subset can meet the requirement of the first terminal device, and redundant information sent to the policy control network element can be reduced.

In a possible implementation, the third request message further includes the capability information of the first terminal device, and the capability information of the first terminal device is used to determine the second information.

The data management network element may store a large amount of information. For example, the data management network element stores six correspondences, and each of the six correspondences is a correspondence between one group identifier and one or more data types. The third request message sent by the mobility management network element to the data management network element may further include the capability information of the first terminal device, so that the data management network element may also determine, based on the capability information of the first terminal device, a correspondence that needs to be sent to the mobility management network element. For example, the data management network element may determine that some of the data types corresponding to the six correspondences are not supported by the first terminal device. For example, a data type corresponding to one of the six correspondences is a data type 2 that is not supported by the first terminal device. In this case, the subset determined by the data management network element may not include the correspondence, but include only the remaining five correspondences. In this way, data types corresponding to the obtained correspondences sent to the mobility management network element are all supported by the first terminal device, so that subsequent processing by the network element is facilitated, and a processing result better meets a requirement of the first terminal device.

For technical effects of the second aspect or the implementations, refer to descriptions of the technical effects of the first aspect or the corresponding implementations.

According to a third aspect, a third communication method is provided. For example, the method is performed by a policy control network element or a chip and a first network element or a chip. For example, the first network element is a mobility management network element or a database storage network element. In a 5G system, the mobility management network element is, for example, an AMF, the policy control network element is, for example, a PCF, and the database storage network element is, for example, a UDR. The method includes: The first network element sends first information to the policy control network element, where the first information includes a group identifier and a data type corresponding to the group identifier, the group identifier indicates a group, and the group includes one or more terminal devices. The policy control network element receives the first information from the first network element. The policy control network element obtains first data based on the first information, where the first data is data corresponding to the data type.

In a possible implementation, the first network element is the mobility management network element or the database storage network element.

For technical effects of the third aspect or the implementations, refer to descriptions of the technical effects of the first aspect or the corresponding implementations, or refer to descriptions of the technical effects of the second aspect or the corresponding implementations.

According to a fourth aspect, an embodiment of this application provides an apparatus. The apparatus may be a policy control network element, a mobility management network element, or a chip. The apparatus has a function of implementing each embodiment of any one of the first aspect, the second aspect, or the third aspect. The function may be implemented by hardware, or may be implemented by hardware executing corresponding software. The hardware or the software includes one or more modules corresponding to the function.

According to a fifth aspect, an embodiment of this application provides an apparatus. The apparatus includes a processor and a memory. The memory is configured to store computer-executable instructions. When the apparatus runs, the processor executes the computer-executable instructions stored in the memory, to enable the apparatus to perform the method according to any one of the first aspect or the implementations of the first aspect, the method according to any one of the second aspect or the implementations of the second aspect, the method performed by the first network element according to any one of the third aspect or the implementations of the third aspect, or the method performed by the policy control network element according to any one of the third aspect or the implementations of the third aspect.

According to a sixth aspect, an embodiment of this application provides a communication system. The communication system may include a first network element and a policy control network element. For example, the first network element is a mobility management network element or a database storage network element. In a 5G system, the mobility management network element is, for example, an AMF, the policy control network element is, for example, a PCF, and the database storage network element is, for example, a UDR. In the communication system, the first network element is configured to send first information to the policy control network element, where the first information includes a group identifier and a data type corresponding to the group identifier, the group identifier indicates a group, and the group includes one or more terminal devices and the policy control network element is configured to: receive the first information from the first network element, and obtain first data based on the first information, where the first data is data corresponding to the data type.

In a possible implementation, the first network element is the mobility management network element and the mobility management network element is further configured to: send a third request message to a data management network element, where the third request message requests to obtain subscription information of a first terminal device; and receive second information from the data management network element, where the second information includes group identifiers and corresponding data types, and the first information is a subset of the second information.

In a possible implementation, the mobility management network element is further configured to: receive a registration request message from the first terminal device, where the registration request message includes capability information of the first terminal device; and determine the subset based on the capability information of the first terminal device.

In a possible implementation, that the mobility management network element is configured to determine the subset based on the capability information of the first terminal device includes: The mobility management network element is configured to: determine that the first terminal device supports a data type corresponding to the subset but does not support a data type corresponding to remaining information in the second information other than the subset; and/or determine that the policy control network element requires the data type corresponding to the subset but does not require a data type corresponding to remaining information in the second information other than the subset.

In a possible implementation, the third request message further includes the capability information of the first terminal device, and the capability information of the first terminal device is used to determine the second information.

In a possible implementation, the communication system further includes a database storage network element, configured to store the data corresponding to the data type. That the policy control network element is configured to obtain the first data based on the first information includes: The policy control network element is configured to: determine a database storage network element based on the data type; send a second request message to the database storage network element; and receive the first data from the data repository network element, where the second request message includes the group identifier, and the second request message requests to obtain the first data.

In a possible implementation, the policy control network element is further configured to: send a second subscription request message to the data repository network element; and receive updated first data, where the second subscription request message requests to subscribe to an update notification of the first data.

In a possible implementation, the policy control network element is further configured to determine that the data corresponding to the data type is not stored.

In a possible implementation, the policy control network element is further configured to determine, based on the capability information of the first terminal device, that the first terminal device supports use of the data corresponding to the data type.

In a possible implementation, that the policy control network element is configured to obtain the first data based on the first information includes: The policy control network element is configured to: determine that the first data is locally stored; and obtain the first data locally.

In a possible implementation, the first network element is a data repository network element and the policy control network element is further configured to: send a first request message to the data repository network element, where the first request message requests to obtain subscription information of a first terminal device; and receive the first information from the database network element, where the first terminal device belongs to the group.

In a possible implementation, the policy control network element is further configured to: generate policy information based on the first data, and send the policy information to the first terminal device.

In a possible implementation, that the policy control network element is configured to generate the policy information based on the first data includes: The policy control network element is configured to: determine, based on capability information of the first terminal device, that the first terminal device supports the data type; and generate the policy information based on the first data.

For technical effects of the sixth aspect or the implementations, refer to descriptions of the technical effects of the first aspect or the corresponding implementations, or refer to descriptions of the technical effects of the second aspect or the corresponding implementations.

According to a seventh aspect, a computer-readable storage medium is provided. The computer-readable storage medium is configured to store a computer program. When the computer program is run on a computer, the computer is enabled to perform the method according to any one of the first aspect or the possible implementations.

According to an eighth aspect, a computer-readable storage medium is provided. The computer-readable storage medium is configured to store a computer program. When the computer program is run on a computer, the computer is enabled to perform the method according to any one of the second aspect or the possible implementations.

According to a ninth aspect, a computer-readable storage medium is provided. The computer-readable storage medium is configured to store a computer program. When the computer program is run on a computer, the computer is enabled to perform the method according to any one of the third aspect or the possible implementations.

According to a tenth aspect, a computer-readable storage medium is provided. The computer-readable storage medium is configured to store a computer program. When the computer program is run on a computer, the computer is enabled to perform the method according to any one of the fourth aspect or the possible implementations.

According to an eleventh aspect, a computer program product including instructions is provided. The computer program product is configured to store a computer program. When the computer program is run on a computer, the computer is enabled to perform the method according to any one of the first aspect or the possible implementations.

According to a twelfth aspect, a computer program product including instructions is provided. The computer program product is configured to store a computer program. When the computer program is run on a computer, the computer is enabled to perform the method according to any one of the second aspect or the possible implementations.

According to a thirteenth aspect, a computer program product including instructions is provided. The computer program product is configured to store a computer program. When the computer program is run on a computer, the computer is enabled to perform the method according to any one of the third aspect or the possible implementations.

According to a fourteenth aspect, a computer program product including instructions is provided. The computer program product is configured to store a computer program. When the computer program is run on a computer, the computer is enabled to perform the method according to any one of the fourth aspect or the possible implementations.

By using the solutions provided in embodiments of this application, it can be ensured as much as possible that the policy control network element can accurately obtain the data corresponding to the group to which the terminal devices belong.

DETAILED DESCRIPTION OF ILLUSTRATIVE EMBODIMENTS

Figure 1:
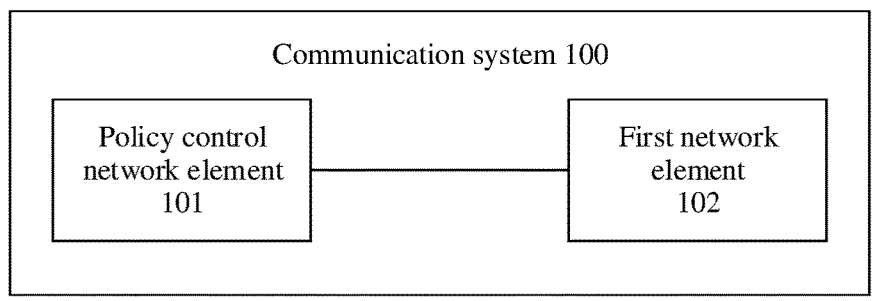
FIG. 1 is a schematic diagram of a communication system according to an embodiment of this application.

To make objectives, technical solution, and advantages of embodiments of this application clearer, the following further describes embodiments of this application in detail with reference to the accompanying drawings.

The following describes some terms in embodiments of this application, to facilitate understanding of a person skilled in the art.

(1) A network element is also referred to as a network device, and includes an access network element which is also referred to as an access network device, for example, a base station (for example, an access point). The base station may be a device that communicates with a wireless terminal apparatus over an air interface in an access network by using one or more cells. The network element may be configured to mutually convert a received over-the-air frame and an internet protocol (IP) packet, and serve as a router between the terminal apparatus and a remaining part of the access network. The remaining part of the access network may include an IP network. The network element may further coordinate attribute management of the air interface. For example, the network element may include an evolved NodeB (NodeB, eNB, or eNodeB, evolved NodeB) in a long term evolution (LTE) system or an LTE-advanced (LTE-A) system, a next generation NodeB (gNB) in a 5th generation mobile communication technology (5G) new radio (NR) system, or a central unit (CU) and a distributed unit (DU) in a cloud access network (Cloud-RAN) system. This is not limited in embodiments of this application. In embodiments of this application, the network element further includes a core network element which is also referred to as a core network device. In a 4th generation mobile communication technology (4G) system, the core network device includes, for example, a mobility management entity (MME). In a 5G system, the core network device includes, for example, a policy control function (PCF), a unified data management (UDM), a user plane function network element, a mobility management function (AMF), or a unified data repository (UDR). It may be considered that, after evolution from 4G to 5G, functions of the MME are separated into the AMF and a session management function (SMF). The AMF is configured to manage a mobility context of a user, and the SMF is configured to manage a session context. In the 4th generation mobile communication technology (4G) system, the user plane function network element includes, for example, a serving gateway (SGW) and a packet data network gateway (PDN-GW). In the 5G system, the user plane function network element includes, for example, a user plane function (UPF) network element, and is mainly responsible for connecting to an external network. It may be considered that the UPF in the 5G system is equivalent to a combination of the SGW and the PDN-GW in the 4G LTE system.

(2) A terminal device may be a device configured to implement a wireless communication function. The terminal device may be user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or fixed.

The terminal device may set up a connection to a carrier network through an interface (for example, N1) provided by the carrier network, and use a service such as data and/or voice provided by the carrier network. The terminal device may further access a data network (DN) through the carrier network, and use a carrier service deployed on the DN and/or a service provided by a third party. The third party may be a service provider other than the carrier network and the terminal device, and may provide another service such as data and/or voice for the terminal device. A specific representation form of the third party may be specifically determined based on an actual application scenario. This is not limited herein.

(3) The terms "system" and "network" may be used interchangeably in embodiments of this application. "A plurality of" means two or more. In view of this, "a plurality of" may also be understood as "at least two" in embodiments of this application. "At least one" may be understood as one or more, for example, one, two, or more. For example, "include at least one" means "include one, two, or more", and there is no limitation on which is included. For example, "include at least one of A, B, and C" may mean "include A, B, or C", "include A and B, A and C, or B and C", or "include A, B, and C". Similarly, understanding of descriptions such as "at least one type" is similar. The term "and/or"

describes an association relationship between associated objects and indicates that three relationships may exist. For example, A and/or B may represent the following three cases: Only A exists, both A and B exist, and only B exists. In addition, the character "/", unless otherwise specified, usually indicates an "or" relationship between the associated objects. For example, A/B may represent A or B.

In addition, to clearly describe the technical solutions in embodiments of this application, in embodiments of this application, terms such as "first" and "second" are used to distinguish between same items or similar items that have basically same functions and purposes. A person skilled in the art may understand that the terms such as "first" and "second" do not limit content, a size, a sequence, a time sequence, a priority, an importance degree, and the terms such as "first" and "second" do not indicate a definite difference. For example, "first information" and "second information" in embodiments of this application may be same information, or may be different information. This is not specifically limited in embodiments of this application.

It should be noted that, in embodiments of this application, a policy control network element, a database storage network element, a mobility management network element, a data management network element, and the like, and further a PCF, a UDR, an AMF, a UDM, and the like are merely names, and the names constitute no limitation on the devices. In the 5G system and another future communication system, a policy control network element, a database storage network element, a mobility management network element, a data management network element, and the like, and further a PCF, a UDR, an AMF, a UDM, and the like may alternatively have other names. This is not specifically limited in embodiments of this application.

First, an embodiment of this application provides a communication system 100. As shown in FIG. 1, the communication system 100 may include a policy control network element 101 and a first network element 102. For example, the first network element 102 is a mobility management network element, or may be a database storage network element. In FIG. 1, a connection line between the policy control network element 101 and the first network element 102 indicates that the two network elements can communicate with each other. The two network elements may be connected in a wired manner, or may be connected in a wireless manner.

The first network element 102 may send first information to the policy control network element 101. The policy control network element 101 may receive the first information from the first network element 102. The first information includes a group identifier and a data type corresponding to the group identifier, the group identifier indicates a group, and the group includes one or more terminal devices.

The policy control network element 101 may obtain first data based on the first information. The first data is data corresponding to the data type.

One group identifier may correspond to one or more data types, and such a group of correspondences may be understood as one correspondence. Alternatively, a correspondence between one group identifier and one data type is understood as one correspondence. In this case, if one group identifier corresponds to a plurality of data types, the group identifier corresponds to a plurality of correspondences. For example, in Embodiment 1 of this application, one correspondence is a correspondence between one group identifier and one or more data types. In this case, a quantity of correspondences is the same as a quantity of group identifiers. In this embodiment of this application, the group identifier and the data type corresponding to the group identifier may be understood as a correspondence between the group identifier and the data type. The data type corresponding to the group identifier may be data types supported by all or a part of the terminal devices included in the group. The data type corresponding to the group identifier may indicate a control type for controlling the group, a network element that requires group information, or the like.

One group identifier corresponds to one group. A group may have an internal group identifier (internal group ID) that identifies the group in a carrier network, and may further have an external group identifier (external group ID) that identifies the group outside the carrier network. In this case, the group identifier in this embodiment of this application may be an internal group identifier or an external group identifier of the group. If the group identifier is the internal group identifier, the group corresponding to the group identifier may also be referred to as an internal group. Alternatively, if the group identifier is the external group identifier, the group corresponding to the group identifier may also be referred to as an external group. One group may include one or more terminal devices. To be specific, a network may divide the terminal devices into groups, and manage the terminal devices according to the groups, to simplify a management process.

The first network element 102 sends the first information to the policy control network element 101, so that the policy control network element 101 may obtain the first data based on the first information. Because the data type corresponding to the first data corresponds to the group identifier, the data type is applicable to all or a part of the terminal devices included in the group. By using this solution, it can be ensured that the policy control network element 101 can accurately obtain data corresponding to the group to which the terminal devices belong. Further, if another terminal device subsequently initiates registration, and the terminal device also belongs to the group, the policy control network element 101 may not need to request to obtain data corresponding to the data type again. This simplifies an operation process of the policy control network element 101, and reduces power consumption of the policy control network element 101 and signaling overheads.

The embodiment shown in FIG. 1 describes the communication system 100 provided in this embodiment of this application. The following describes, by using an example in which the communication system 100 is used in a 5G system, a network architecture to which the communication system 100 may be applied in the 5G system, or an application scenario of the communication system 100 in the 5G system. The architecture of the 5G communication system is divided into two parts: an access network and a core network. The access network is configured to implement a function related to radio access, and includes a 3rd generation partnership project (3GPP) access network and a non (non)-3GPP access network. The core network is connected to the access network, to implement functions related to user control and management. Scenarios to which the communication system 100 provided in this embodiment of this application may be applied in the 5G system include but are not limited to a non-roaming scenario, a local breakout roaming scenario, and a home routed roaming scenario. The following separately describes the several scenarios.

Figure 2A:
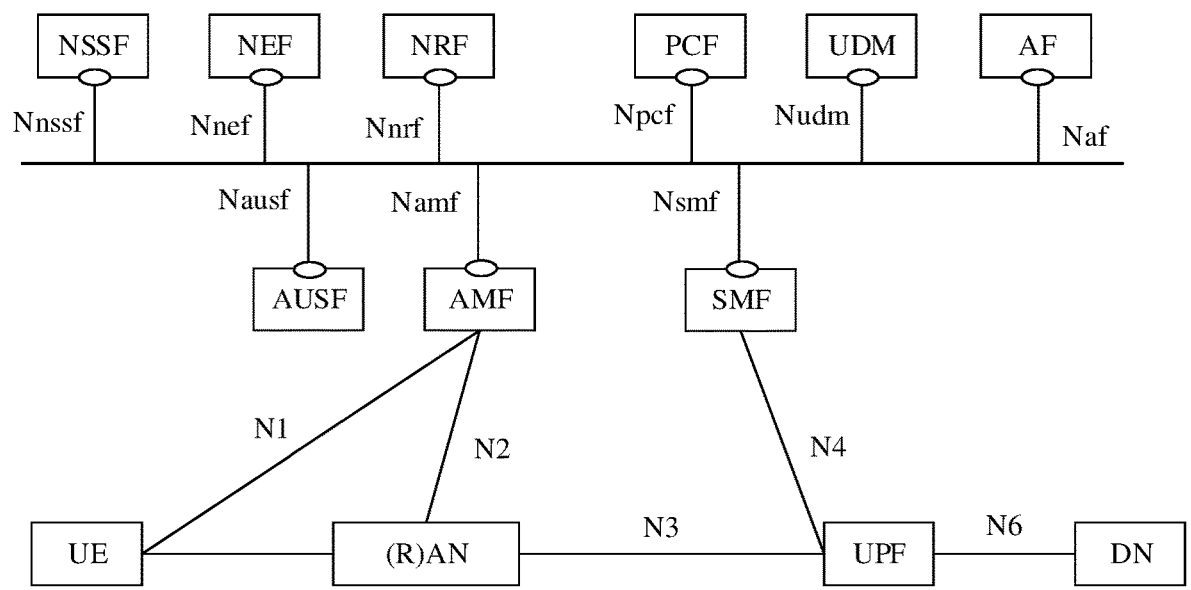
FIG. 2A is a schematic diagram of a network architecture in a non-roaming scenario to which an embodiment of this application is applied.

FIG. 2A is a schematic diagram of a network architecture in a non-roaming scenario. In the network architecture, every two of network elements, including a network slice selection function (NSSF), a network exposure function (NEF), a network function repository function (NRF), a PCF, a UDM, an application function (AF), an authentication server function (AUSF), an AMF, and an SMF, may communicate with each other by using a service method. Certainly, if two of the network elements need to communicate with each other, one network element needs to expose a corresponding service method to the other network element. In FIG. 2A, Nnssf may be considered as a service interface of the NSSF. Similarly, Nnef is a service interface of the NEF, Npcf is a service interface of the PCF, Nudm is a service interface of the UDM, Naf is a service interface of the AF, Nausf is a service interface of the AUSF, Namf is a service interface of the AMF, and Nsmf is a service interface of the SMF. In addition, the AMF and a terminal device may communicate with each other through an N1 interface, the AMF and a radio (R) access network (AN) may communicate with each other through an N2 interface, the SMF and the UPF may communicate with each other through an N4 interface, the terminal device and the (R)AN communicate with each other through an air interface, the (R)AN and the UPF may communicate with each other through an N3 interface, and the UPF and a data network (DN) may communicate with each other through an N6 interface. In addition, the architecture of the non-roaming scenario further includes a database storage network element. For a specific schematic diagram of interaction between another network element and the database storage network element, refer to FIG. 2B.

For example, the policy control network element 101 provided in this embodiment of this application may be implemented through the PCF in the network architecture shown in FIG. 2A. The first network element 102 provided in this embodiment of this application may be implemented through a UDR, or may be implemented through the AMF in the network architecture shown in FIG. 2A. In addition, a data management network element is further used in this embodiment of this application, and may be implemented through the UDM in the network architecture shown in FIG. 2A. For ease of understanding, the following briefly describes some functional network elements used in FIG. 2A.

A mobility management network element is, for example, the first network element 102. In a 4G system, the mobility management network element is, for example, an MME. In a 5G system, the mobility management network element is, for example, an AMF. This embodiment of this application is not limited thereto. In another communication system, the mobility management network element may alternatively be implemented through another network element. For example, the mobility management network element is the AMF. The AMF is mainly responsible for wireless interconnection, termination of a RAN control plane (CP) interface, namely, an N2 interface, non-access stratum (NAS) termination, NAS encryption and integrity protection, registration management, connection management, reachability management, mobility management, and session management (SM) message transfer between user equipment (UE) and an SMF, or notification of a mobility event of UE.

A policy control network element is, for example, the policy control network element 101. In a 5G system, the policy control network element is, for example, a PCF. In another communication system, the policy control network element may alternatively be implemented through another network element. The PCF mainly supports providing a unified policy framework to control network behavior, and providing a policy rule for a control layer network function, and is responsible for obtaining policy decision-related subscription information of a user.

In a 5G system, a data management network element is, for example, a UDM. In another communication system, the data management network element may alternatively be implemented through another network element. The UDM is configured to: generate an authentication credential, process a subscriber identifier (for example, store and manage a subscription permanent identifier), control access authorization, manage subscription data, and the like. For example, in some embodiments of this application, the UDM may further store a correspondence between a group identifier and a data type.

Figure 2B:
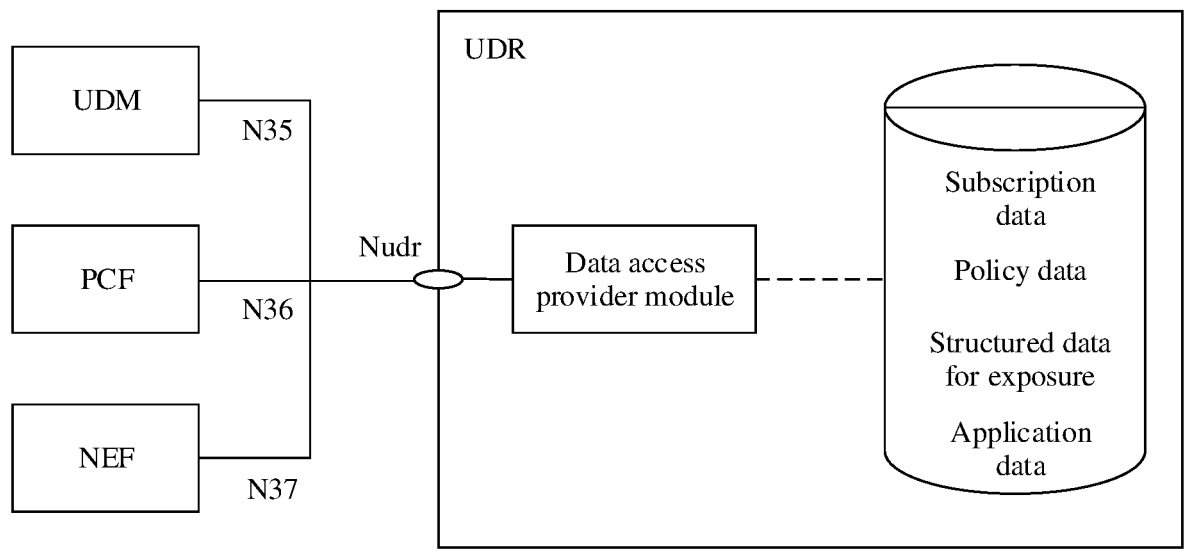
FIG. 2B is a schematic diagram of data stored in a UDR.

A database storage network element is, for example, the first network element 102. In a 5G system, the database storage network element is, for example, a UDR. In another communication system, the database storage network element may alternatively be implemented through another network element. In an architecture of the 5G system, a UDM, a PCF, and an NEF are allowed to store data in the UDR. Types of the data stored in the UDR include subscription data, policy data, structured data for exposure (structured data for exposure), application data, and the like. Different UDRs may be deployed in a network. Each UDR store different data sets or subsets, and may serve different NF sets. For example, in some embodiments of this application, the UDR may store a correspondence between a group identifier and a data type. FIG. 2B is a schematic diagram of information stored in a UDR. It can be learned from FIG. 2B that, the UDM may communicate with a data access provider module of the UDR through an N35 interface, to send to-be-stored data to the UDR; the PCF may communicate with the data access provider module of the UDR through an N36 interface, to send to-be-stored data to the UDR; and the NEF may communicate with the data access provider module of the UDR through an N37 interface, to send to-be-stored data to the UDR. The data access provider module then stores the received data.

In a 5G system, a session management network element is, for example, an SMF. In another communication system, the session management network element may alternatively be implemented through another network element. For example, the session management network element is the SMF. The SMF may provide session management functions such as session setup, modification, and release, including a function such as maintenance of a tunnel between a UPF and an access network (AN) node, allocation and management of an internet protocol (IP) address of UE, a function of a dynamic host control protocol (DHCP), user plane (UP) selection and control, configuration of UPF traffic diversion, termination of a policy control function interface, charging, roaming, or a policy control related function.

In a 5G system, a user plane function network element is, for example, a UPF. In another communication system, the user plane function network element may alternatively be implemented through another network element. For example, the user plane function network element is the UPF. The UPF is an entity for forwarding user plane data, serves as an external protocol data unit (PDU) session point for data network interconnection, and has a function such as packet routing and forwarding, packet detection, user plane policy execution, lawful interception, traffic usage reporting, or quality of service (QoS) processing.

A network exposure function (NEF) network element is mainly configured to support capability and event exposure.

An application function (AF) network element mainly supports interacting with a 3GPP core network to provide a service, for example, to affect a data routing decision and a policy control function, or provide some third-party services for a network side.

A DN is a service network that provides a data transmission service for a user, for example, an IP multimedia service (IMS), or the internet.

An authentication server function (AUSF) is a control plane network element provided by a carrier, and is configured to perform authentication (namely, authentication performed by a 3GPP network on a subscribed user of the 3GPP network).

In addition, a concept of the service method is mentioned when the network architecture shown in FIG. 2A is described. Specifically, in the 5G system, it is currently considered that control plane network elements may interact with each other by using the service method, and user plane network elements may interact with each other by using a point-to-point method. For example, in the 5G system, an NRF, as a control plane network element, may expose some service methods, and another device may interact with the NRF by using the service methods. Table 1 shows some service methods exposed by the NRF.

TABLE 1

| Service name | Service operation (service-operations) | Operation semantics (operation semantics) | Example consumer (example-consumer(s)) |
|---|---|---|---|
| Nnrf_NF management | Network function (NF) register | Request/response | AMF, SMF, UDM, AUSF, NEF, PCF, SMSF, NSSF, UPF, and BSF |
| | NF update | Request/response | AMF, SMF, UDM, AUSF, NEF, PCF, SMSF, NSSF, UPF, and BSF |
| | Network function (NF) deregister | Request/response | AMF, SMF, UDM, AUSF, NEF, PCF, SMSF, NSSF, UPF, and BSF |
| | NF status (status) subscribe | Subscribe/notify | AMF, SMF, PCF, NEF, NSSF, SMSF, and AUSF |
| | NF status notify | | AMF, SMF, PCF, NEF, NSSF, SMSF, and AUSF |
| | NF status unsubscribe | | AMF, SMF, PCF, NEF, NSSF, SMSF, and AUSF |
| Nnrf_NF discovery | Request | Request/response | AMF, SMF, PCF, NEF, NSSF, SMSF, and AUSF |

The SMSF in Table 1 is a short message service function (SMSF), where an SMS is a short message service. The BSF is a binding support function (BSF).

It can be learned from Table 1 that the NRF exposes all the service methods in Table 1 to the AMF and the SMF, and exposes the NF register method, the NF update method, and the NF deregister method in the NF management service to the UPF. In this case, the UPF may send, to the NRF, a service request associated with the UPF, such as registration, update, or deregistration.

For example, in the network architecture shown in FIG. 2A, it can be learned from Table 1 that the NRF exposes the NF status notify service method to the AMF, the SMF, the PCF, the NEF, the NSSF, the SMSF, and the AUSF, and the AMF, the SMF, the PCF, the NEF, the NSSF, the SMSF, and the AUSF may all communicate with the NRF by using the NF status notify service method. However, because the NRF does not expose the NF status notify service method to the UDM, the UDM cannot communicate with the NRF by using the NF status notify service method.

Figure 3:
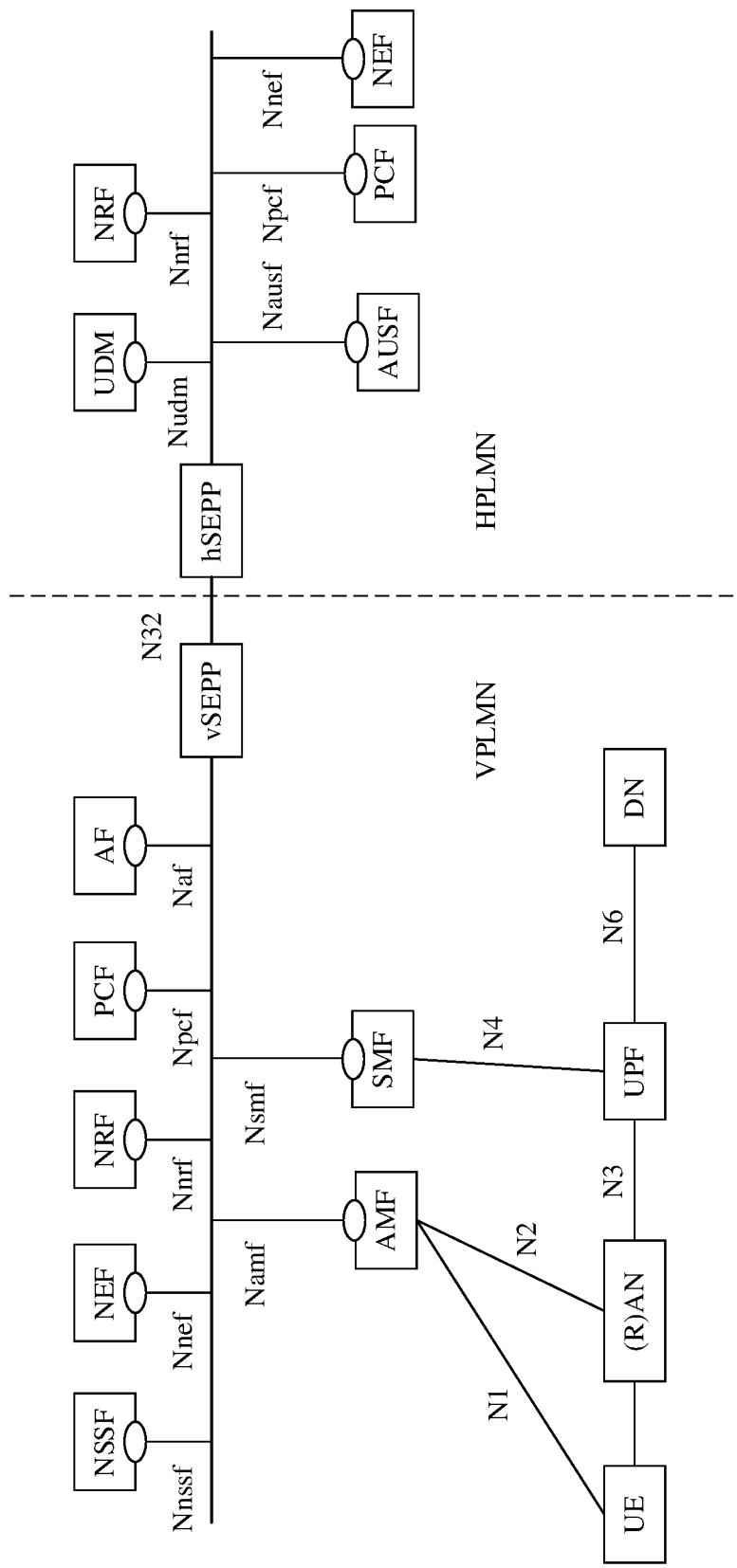
FIG. 3 is a schematic diagram of a network architecture in a local breakout roaming scenario to which an embodiment of this application is applied.

FIG. 3 is a schematic diagram of a network architecture in a local breakout roaming scenario. In the network architecture, a terminal device roams. Therefore, two areas: a VPLMN and an HPLMN are included. In the VPLMN, every two of network elements, including an NSSF, an NEF, an NRF, a PCF, an AF, an AMF, an SMF, and a visit security edge protection proxy (vSEPP) may communicate with each other by using a service method. Certainly, if two of the network elements need to communicate with each other, one network element needs to expose a corresponding service method to the other network element. Examples are not provided. In addition, the AMF and the terminal device may communicate with each other through an N1 interface, the AMF and a (R)AN may communicate with each other through an N2 interface, the SMF and a UPF may communicate with each other through an N4 interface, the terminal device and the (R)AN may communicate with each other, the (R)AN and the UPF may communicate with each other through an N3 interface, and the UPF and a DN may communicate with each other through an N6 interface. In the HPLMN, every two of network elements, including a UDM, an NRF, a PCF, an AUSF, an NEF, and a home security edge protection proxy (hSEPP) may communicate with each other by using a service method. Certainly, if two of the network elements need to communicate with each other, one network element needs to expose a corresponding service method to the other network element. Examples are not provided. The vSEPP and the hSEPP may communicate with each other through an N32 interface.

For example, the policy control network element 101 provided in this embodiment of this application may be implemented through the PCF in the HPLMN in the network architecture shown in FIG. 3. The first network element 102 provided in this embodiment of this application may be implemented through a UDR, where for example, the UDR may be located in the HPLMN in the network architecture shown in FIG. 3, or may be implemented through the AMF in the VPLMN in the network architecture shown in FIG. 3. In addition, a data management network element is further used in this embodiment of this application, and may be implemented through the UDM in the HPLMN in the network architecture shown in FIG. 3.

Figure 4:
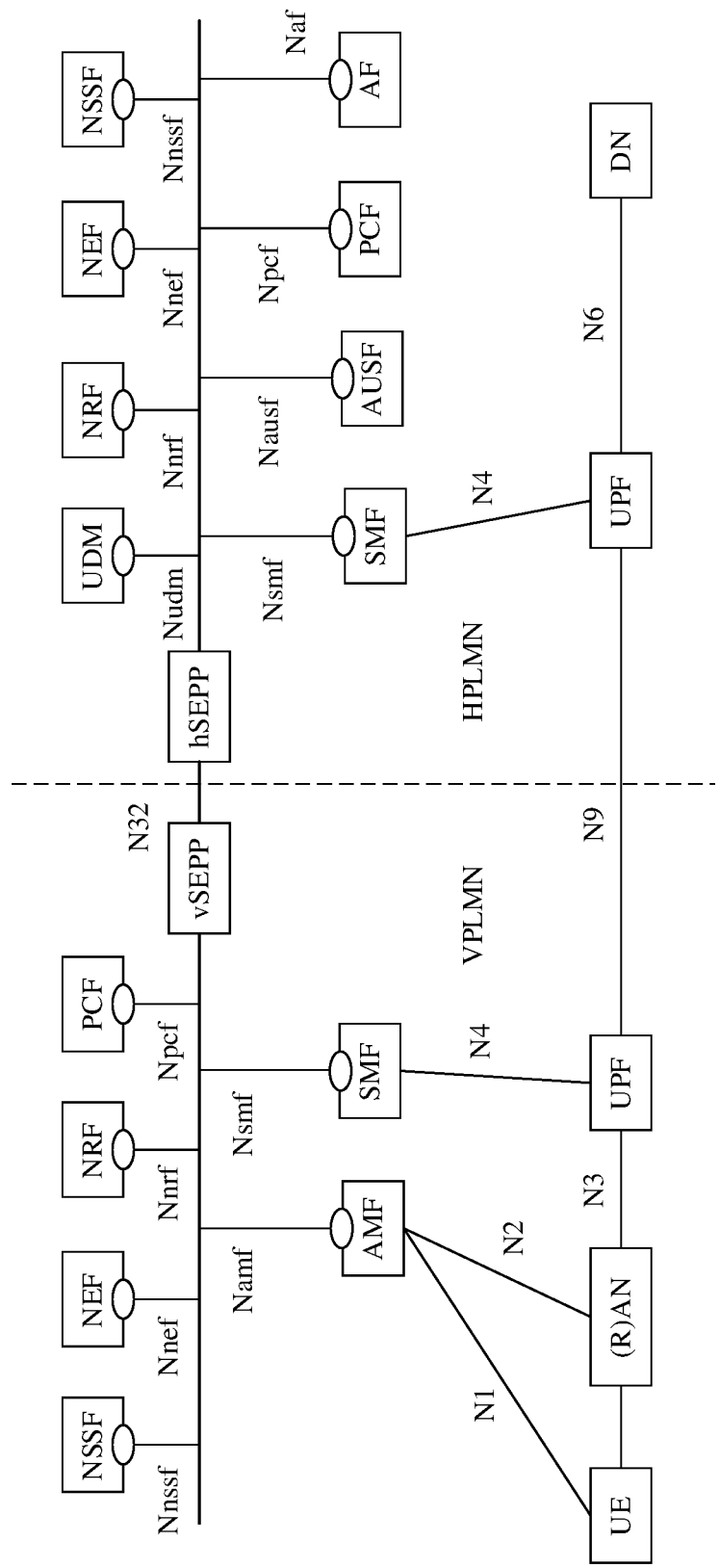
FIG. 4 is a schematic diagram of a network architecture in a home routed roaming scenario to which an embodiment of this application is applied.

FIG. 4 is a schematic diagram of a network architecture in a home routed roaming scenario. In the network architecture, a terminal device also roams. Therefore, two areas: a VPLMN and an HPLMN are also included. In the VPLMN, every two of network elements, including an NSSF, an NEF, an NRF, a PCF, an AMF, an SMF, and a vSEPP may communicate with each other by using a service method. Certainly, if two of the network elements need to communicate with each other, one network element needs to expose a corresponding service method to the other network element. Examples are not provided. In addition, the AMF and the terminal device may communicate with each other through an N1 interface, the AMF and a (R)AN may communicate with each other through an N2 interface, the SMF and a UPF may communicate with each other through an N4 interface, the terminal device and the (R)AN may communicate with each other, the (R)AN and the UPF may communicate with each other through an N3 interface, and the UPF and a DN may communicate with each other through an N6 interface. In the HPLMN, every two of network elements, including a UDM, an NRF, an NSSF, an SMF, an AF, a PCF, an AUSF, an NEF, and an hSEPP may communicate with each other by using a service method. Certainly, if two of the network elements need to communicate with each other, one network element needs to expose a corresponding service method to the other network element. Examples are not provided. In addition, the SMF and a UPF may communicate with each other through an N4 interface, the UPF and a DN may communicate with each other through an N6 interface, the UPF in the VPLMN and the UPF in the HPLMN may communicate with each other through an N9 interface, and the vSEPP and the hSEPP may communicate with each other through an N32 interface.

For example, the policy control network element 101 provided in this embodiment of this application may be implemented through the PCF in the HPLMN in the network architecture shown in FIG. 4. The first network element 102 provided in this embodiment of this application may be implemented through a UDR, where for example, the UDR may be located in the HPLMN in the network architecture shown in FIG. 4, or may be implemented through the AMF in the VPLMN in the network architecture shown in FIG. 4. In addition, a data management network element is further used in this embodiment of this application, and may be implemented through the UDM in the HPLMN in the network architecture shown in FIG. 4.

Related network elements in the network architecture shown in FIG. 3 and the network architecture shown in FIG. 4 are correspondingly described after the network architecture shown in FIG. 2A is described. Therefore, details are not described again.

In FIG. 2A, FIG. 3, or FIG. 4, a main function of the (R)AN is to control the terminal device to access a mobile communication network in a wireless manner. The (R)AN is a part of a mobile communication system, and implements a radio access technology. A (R)AN device includes but is not limited to: a gNB in 5G, an eNB, a radio network controller (RNC), a NodeB (NB), a base station controller (base station controller, BSC), a base transceiver station (BTS), a home base station (for example, a home evolved NodeB, or a home NodeB, HNB), a baseband unit (BBU), a transmission point (TRP), a transmission point (TP), a mobile switching center, and the like. In addition, the (R)AN device may further include a wireless fidelity (Wi-Fi) access point (AP) and the like.

The foregoing describes a policy information obtaining system 100 provided in embodiments of this application, and several network architectures to which the system 100 may be applied in the 5G system. The following continues to use the 5G system as an example to describe the technical background of embodiments of this application.

In the 5G system, a network supports control and management of a group of terminal devices. For example, the network may divide the terminal devices into a plurality of groups, and allocate an internal group identifier to each of the plurality of groups, to use the internal group identifier to manage and control information of terminal devices included in the group. The following describes several scenarios to which the groups may be applied.

In a first scenario, a background data transfer (BDT) policy may be applied to a group of terminal devices.

Figure 5:
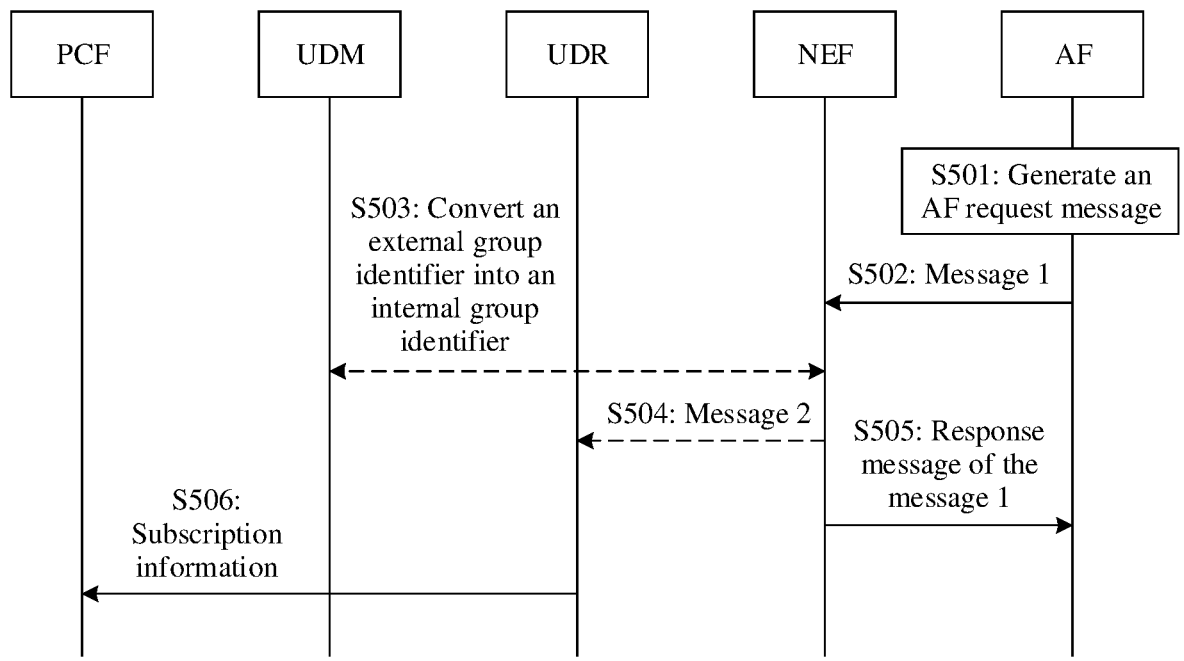
FIG. 5 is a flowchart of applying an xBDT policy to a group of terminal devices.

In an enhancement subject of the BDT, an AF may determine that a policy negotiated with a network is used for a group of terminal devices, and the policy may be used for a future PDU session of the group of terminal devices. In addition, the AF stores, in application data of a UDR through an NEF, information such as a reference identifier of the negotiated background data transfer policy, and an internal group identifier corresponding to the group of terminal devices. In a transmission process, the NEF converts an external group identifier (external group ID) received from the AF into the internal group identifier. Further, the UDR sends the reference identifier of the corresponding background data transfer policy to a PCF that subscribes to application data of the group. Alternatively, when a PCF requests, from the UDR, application data of the corresponding group, the UDR sends the reference identifier of the background data transfer policy to the PCF. For example, for a procedure of the process, refer to FIG. 5.

S501: If an AF determines to apply a policy negotiated with a network to a future PDU session of a group, the AF generates an AF request message.

S502: The AF invokes a service provided by an NEF. That is, the AF sends Nnef_ApplyPolicy_Create to the NEF. The NEF receives Nnef_ApplyPolicy_Create from the AF. For ease of description, Nnef_ApplyPolicy_Create herein is referred to as a message 1. The message 1 includes a reference identifier of a background data transfer policy and an external group identifier of the group.

A group may have an internal group identifier used for internal management of a carrier network. In addition, the group may further have an external group identifier that identifies the group outside the carrier network.

After receiving the message 1, the NEF may invoke a service provided by a UDM, to convert the external group identifier of the group into an internal group identifier of the group.

S503: The NEF invokes the service of the UDM, to convert the external group identifier into the internal group identifier.

S504: The NEF sends a message 2 to a UDR. The UDR receives the message 2 from the NEF. The message 2 may include information requested by the NEF. For example, the message 2 includes (data set=application data; data subset=background data transfer; and data key=internal group identifier). The data set refers to a data type, which is the application data. The data subset refers to a further subdivided type under the application type indicated by the data set, which is the BDT. The data key is the internal group identifier.

In this way, the NEF stores the requested information in the UDR.

S505: The NEF invokes the service provided by the NEF, to send Nnef_ApplyPolicy_CreateResponse to the AF. The AF receives Nnef_ApplyPolicy_CreateResponse from the NEF. For ease of description, Nnef_ApplyPolicy_CreateResponse herein is referred to as a message 3. The message 3 is a response message of the message 1.

S506: The UDR sends corresponding information to a PCF based on subscription of the PCF.

For example, if the PCF subscribes to data update of the internal group identifier, information sent by the UDR to the PCF may include data set=application data, and data subset=background data transfer.

Further, if the PCF needs to send the policy corresponding to the BDT to a terminal device, the PCF may generate policy information of the terminal device based on the received information, and send the policy information to the terminal device. The PCF is a PCF that provides a policy (for example, a policy used by the terminal device to set up the PDU session) for the terminal device when the terminal device accesses the network.

In a second scenario, a 5G VN group (group for short) may be created in a 5G virtual network (VN) network.

For example, in the 5G VN network, an AF may dynamically create the group, and send corresponding group information to the network through an NEF. The group information may be stored in a UDR. Further, the UDR may send updated subscription data of the corresponding group to a PCF that subscribes to the subscription data of the group.

Alternatively, when a PCF requests subscription data of the corresponding group from the UDR, the UDR may send the subscription data of the group to the PCF. For example, for a procedure of the process, refer to FIG. 6.

S601: In a 5G VN network, an AF invokes a service provided by an NEF, to send Nnef_ParameterProvision_Create to the NEF. The NEF receives Nnef_ParameterProvision_Create from the AF. For ease of description, Nnef_ParameterProvision_Create herein is referred to as a message 1.

The message 1 includes an external group identifier of a group, group data of the group, and group member information of the group. The group data may include a data network name (DNN), single network slice selection assistance information (S-NSSAI), a PDU session type, an application descriptor, secondary authentication and/or authorization information (that indicates whether secondary authentication or authorization needs to be performed), and the like. The PDU session type may include an ethernet type, an unstructured type, an IPv4 type, an IPv6 type, an IPv4v6 type, or the like. The application descriptor may identify data, and is used as an input for generating a user equipment routing selection policy (URSP).

S602: The NEF invokes a service provided by a UDM, to send Nudm_ParameterProvision_create to the UDM. The UDM receives Nudm_ParameterProvision_create from the NEF. For ease of description, Nudm_ParameterProvision_create herein is referred to as a message 2.

If the NEF determines that the AF is authorized to obtain a group parameter, the NEF sends the message 2 to the UDM. The message 2 may include a parameter in the message 1.

S603: The UDM invokes a service provided by a UDR, to send Nudr_DM_Query_request to the UDR. The UDR receives Nudr_DM_Query_request from the UDM. For ease of description, Nudr_DM_Query_request herein is referred to as a message 3.

The UDM may query subscription information from the UDR, to determine whether the AF can be authorized to update data.

S604: The UDR invokes the service provided by the UDR, to send Nudr_DM_Query_response to the UDM. The UDM receives Nudr_DM_Query_response from the UDR. For ease of description, Nudr_DM_Query_response herein is referred to as a message 4. The message 4 is a response message of the message 3, and may indicate that the AF is authorized to update data or the AF is not authorized to update data.

Figure 6:
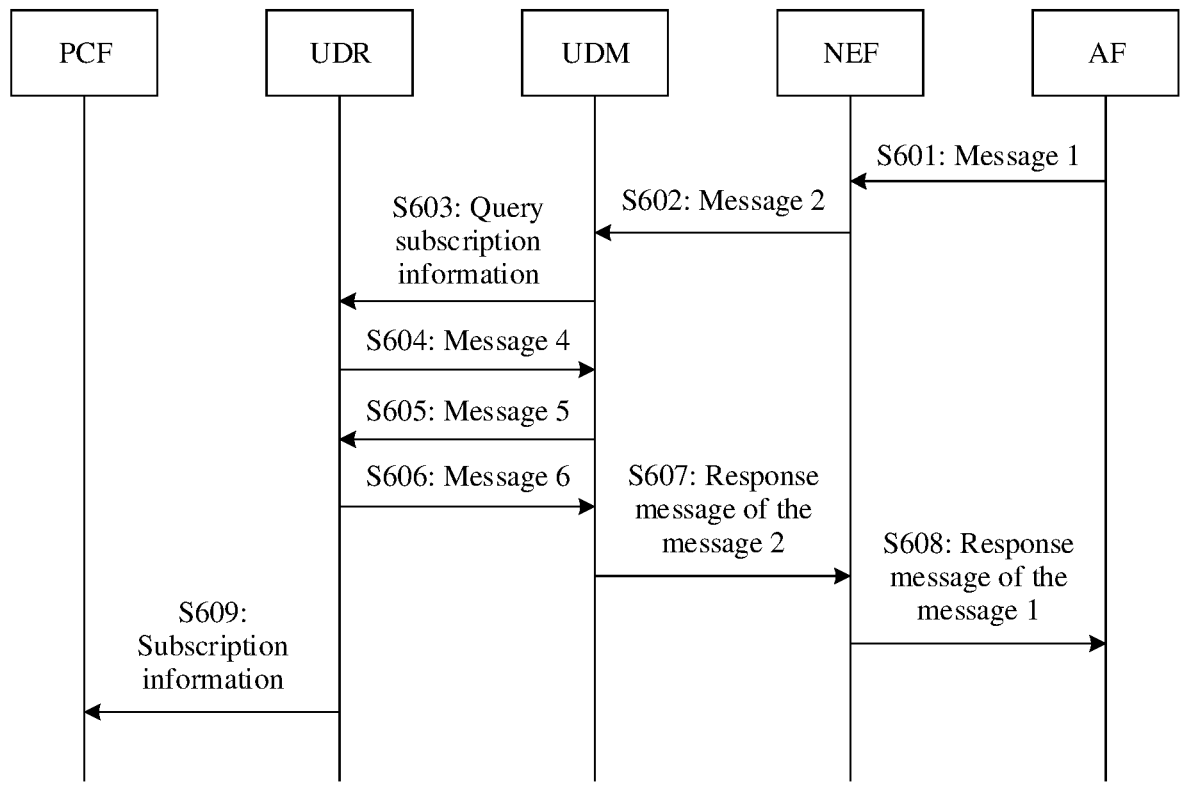
FIG. 6 is a flowchart of group management in a 5G VN network.

S603 and S604 are optional steps, and are represented by dashed lines in FIG. 6.

S605: The UDM invokes the service provided by the UDR, to send Nudr_DM_Create_request to the UDR. The UDR receives Nudr_DM_Create_request from the UDM. For ease of description, Nudr_DM_Create_request herein is referred to as a message 5. If S603 and S604 are not performed, S605 may be performed after S602. Alternatively, if S603 and S604 are performed, S605 may be performed when the message 4 indicates that the AF is authorized to update data; or S605 is not performed when the message 4 indicates that the AF is not authorized to update data.

If S603 and S604 are performed, when the UDM determines to authorize the AF to update data, the UDM needs to allocate a unique internal group identifier to a new group created by the AF. The UDM may include the newly allocated internal group identifier and corresponding group data in the message 5.

S606: The UDR invokes the service provided by the UDR, to send Nudr_DM_Create_response to the UDR. The UDM receives Nudr_DM_Create_response from the UDR. For ease of description, Nudr_DM_Create_response herein is referred to as a message 6. The message 6 is a response message of the message 5.

That is, the UDR stores the received information, and returns a response message to the UDM.

S607: The UDM invokes the service provided by the NEF, to send Nudm_ParameterProvision_Create to the NEF. The NEF receives Nudm_ParameterProvision_Create from the UDM. For ease of description, Nudm_ParameterProvision_Create herein is referred to as a message 7. The message 7 is a response message of the message 2.

S608: The NEF invokes the service provided by the NEF, to send Nnef_ParameterProvision_Create to the AF. The AF receives Nnef_ParameterProvision_Create from the NEF. For ease of description, Nnef_ParameterProvision_Create herein is referred to as a message 8. The message 8 is a response message of the message 1.

S609: The UDR sends group information to a PCF based on subscription of the PCF.

For example, the group information sent by the UDR to the PCF may include data set=subscription data, and data subset=5G VN group data. The PCF may generate policy information of a terminal device based on the received group information, and send the policy information to the terminal device. The PCF is a PCF that provides a policy for the terminal device when the terminal device accesses the network.

In a third scenario, congestion management may be performed according to groups.

For example, when a terminal device registers with a network, a UDM may provide, for an AMF, an internal group identifier of a group to which the terminal device belongs, and the AMF may perform congestion management on the group.

A concept of a group may also be used in a scenario other than the foregoing several scenarios. This is not limited in embodiments of this application.

Figure 7:
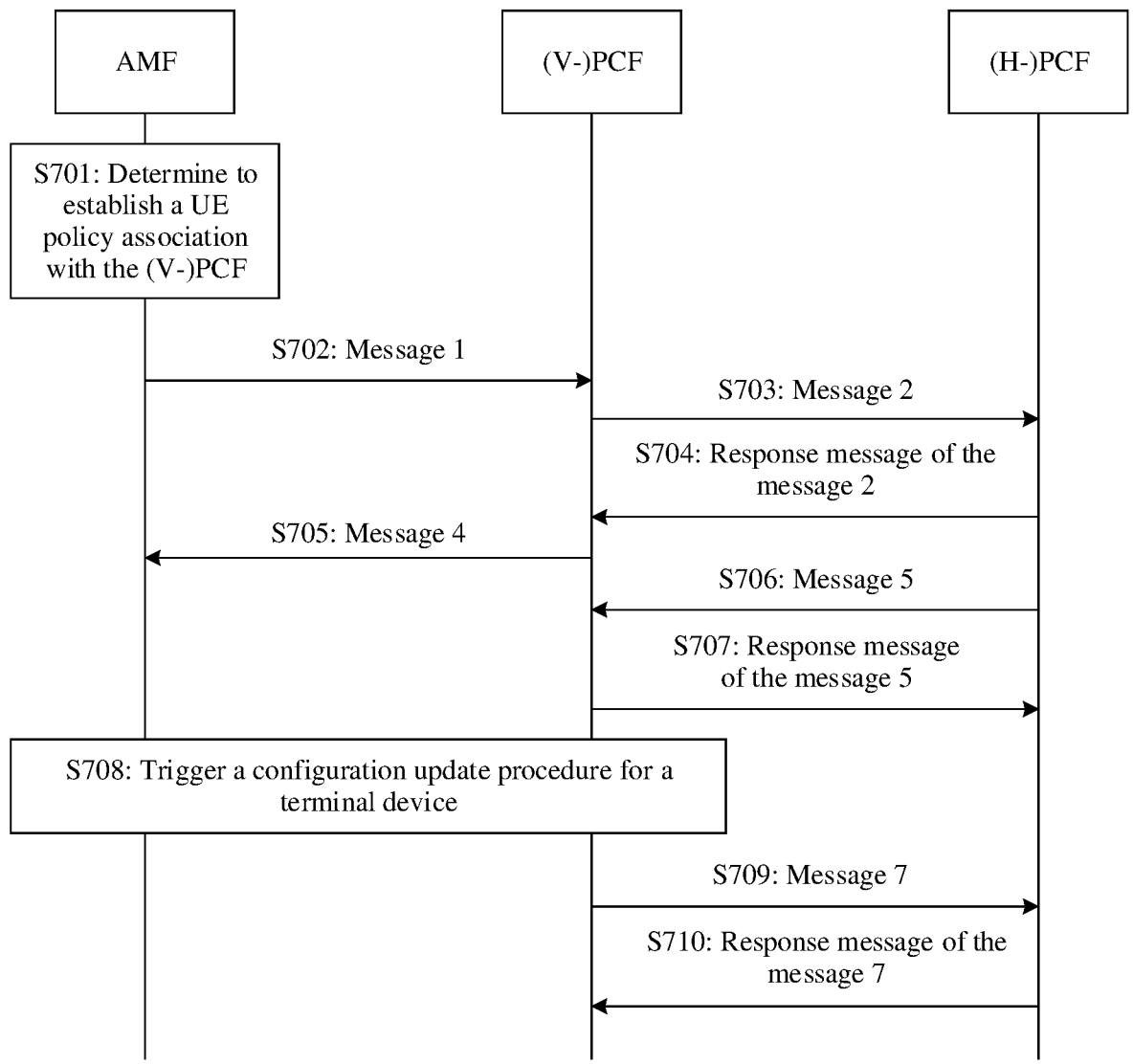
FIG. 7 is a flowchart in which a PCF determines a policy of a terminal device and sends the policy to the terminal device.

After the terminal device registers with the network, the AMF may establish a UE policy control association with a PCF, so that the PCF determines a policy of the terminal device, and sends the determined policy to the terminal device through the AMF. Refer to FIG. 7. A procedure of the method is described. In a non-roaming scenario, a V-PCF is not used. In a roaming scenario, an AMF interacts with a V-PCF, and then the V-PCF interacts with an H-PCF.

S701: After a terminal device registers with a network, an AMF determines to establish a UE policy association with a (V-)PCF. The (V-)PCF indicates that a V-PCF is used in a roaming scenario, or a PCF is used in a non-roaming scenario.

S702: The AMF invokes a service provided by the PCF, to send Npcf_UEPolicyControl_Create_Request to the PCF. The PCF receives Npcf_UEPolicyControl_Create_Request from the AMF. For ease of description, Npcf_UEPolicyControl_Create_Request herein is referred to as a message 1.

The message 1 may include information about the terminal device, for example, information such as a subscription permanent identifier (SUPI), an access type, a radio access type, a permanent equipment identifier (PEI), a UE time zone, and a serving network, and further includes a UE policy container. The access type of the terminal device may indicate that the terminal device is of a 3GPP access type or a non-3GPP access type. The radio access type of the terminal device may indicate a protocol of a data packet corresponding to the terminal device, for example, an IP packet. The UE time zone may indicate a time zone in which the terminal device is located. The serving network may indicate a serving network in which the terminal device is located. The container is not parsed by another intermediate network element during transmission, but is transparently transmitted to the PCF. The container may include information such as a PSI, an operating system identifier, and an indication that the terminal device supports an access network discovery and selection policy (ANDSP). In the roaming scenario, according to a carrier policy, the AMF may provide an ID of a selected H-PCF for the V-PCF, so that the V-PCF is in contact with the H-PCF. In the roaming scenario, S703 and S704 may be performed. In the non-roaming scenario, S703 and S704 do not need to be performed.

S703: The V-PCF invokes a service provided by the H-PCF, to send Npcf_UEPolicyControl_Request to the H-PCF. The H-PCF receives Npcf_UEPolicyControl_Request from the V-PCF. For ease of description, Npcf_UEPolicyControl_Request herein is referred to as a message 2.

For example, the message 2 may include all content included in the message 1. Optionally, after receiving the message 2 from the V-PCF, the H-PCF may store, in a UDR, the information included in the message 2, such as the PEI, the operating system identifier, and the indication that the UE supports the ANDSF.

S704: The H-PCF invokes the service provided by the H-PCF, to send Npcf_UEPolicyControl_Create_Response to the V-PCF. The V-PCF receives Npcf_UEPolicyControl_Create_Response from the H-PCF. For ease of description, Npcf_UEPolicyControl_Create_Response herein is referred to as a message 3. The message 3 is a response message of the message 2. Optionally, the message 3 may further include a policy control request trigger parameter, and the policy control request trigger parameter may indicate a condition under which the AMF needs to interact with the PCF.

S705: The (V-)PCF invokes a service provided by the (V-)PCF, to send Npcf_UEPolicyControl_Create_Response to the AMF. The AMF receives Npcf_UEPolicyControl_Create_Response from the (V-)PCF. For ease of description, Npcf_UEPolicyControl_Create_Response herein is referred to as a message 4. The message 4 may include the policy control request trigger parameter.

S706: The H-PCF invokes a service provided by the V-PCF, to send Npcf_UEPolicyControl_UpdateNotify_Request to the V-PCF. The V-PCF receives Npcf_UEPolicyControl_UpdateNotify_Request from the H-PCF. For ease of description, Npcf_UEPolicyControl_UpdateNotify_Request herein is referred to as a message 5. In the non-roaming scenario, S706 does not need to be performed.

If policy subscription related information and/or the latest PSI(s) of the terminal device stored in the H-PCF are/is unavailable, the H-PCF may obtain the policy subscription related information and the latest PSI(s) of the terminal device from the UDR. The H-PCF may generate policy information of the terminal device based on the obtained information, and send the policy information to the V-PCF by using the message 5. Further, optionally, the H-PCF may subscribe to a subscription information report notification of the terminal device from the UDR.

S707: The V-PCF invokes the service provided by the V-PCF, to send Npcf_UEPolicyControl_UpdateNotify_Response to the H-PCF. The H-PCF receives Npcf_UEPolicyControl_UpdateNotify_Response from the V-PCF. For ease of description, Npcf_UEPolicyControl_UpdateNotify_Response herein is referred to as a message 6. The message 6 is a response message of the message 5.

S708: The (V-)PCF triggers a configuration update procedure for the terminal device, to send the policy information to the terminal device.

S709: When receiving a UE policy receiving notification from the terminal device, the V-PCF invokes the service provided by the H-PCF, to send Npcf_UEPolicyControl_Update_Request to the H-PCF. The H-PCF receives Npcf_UEPolicyControl_Update_Request from the V-PCF. For ease of description, Npcf_UEPolicyControl_Update_Request herein is referred to as a message 7. The UE policy receiving notification may be considered as a response message that is sent by the terminal device to the V-PCF after receiving the policy information. In this case, the V-PCF may further notify the H-PCF of a message indicating that the terminal device has received the policy information.

S710: The H-PCF invokes the service provided by the H-PCF, to send Npcf_UEPolicyControl_Update_Response to the V-PCF. The V-PCF receives Npcf_UEPolicyControl_Update_Response from the H-PCF. For ease of description, Npcf_UEPolicyControl_Update_Response herein is referred to as a message 8. The message 8 is a response message of the message 7.

It can be learned that, when there is a group, according to the registration process described above, the PCF senses neither the group to which the terminal device belongs nor the data type corresponding to the group stored in the UDR. Consequently, the PCF cannot obtain, from the UDR, data required by the terminal device.

In view of this, the technical solutions in embodiments of this application are provided. In embodiments of this application, a policy control network element can obtain a group identifier and a data type corresponding to the group identifier, so that the policy control network element can request data corresponding to the data type. The data type corresponds to the group identifier, that is, corresponds to a group indicated by the group identifier. Therefore, the data type is applicable to one or more terminal devices included in the group. By using this solution, it can be ensured that the policy control network element can accurately obtain data corresponding to the group to which the terminal devices belong. Further, if another terminal device subsequently initiates registration, and the terminal device also belongs to the group, the policy control network element does not need to request to obtain the data corresponding to the data type again. This simplifies an operation of the policy control network element, and reduces power consumption of the policy control network element.

In the network architecture shown in any one of FIG. 2A, FIG. 3, or FIG. 4, network elements related to embodiments of this application mainly include an AMF, a UDM, a PCF, and a UDR.

For ease of description, an example in which the solutions provided in embodiments of this application are applied to a 5G system is used subsequently in embodiments of this application. To be specific, in the following descriptions, an example in which a mobility management network element is an AMF network element, a data management network element is a UDM network element, a database storage network element is a UDR network element, and a policy control network element is a PCF network element is used for description. Further, the AMF network element is referred to as an AMF for short, the UDM network element is referred to as a UDM for short, the UDR network element is referred to as a UDR for short, and the PCF network element is referred to as a PCF for short. In other words, in the following descriptions of embodiments of this application, an AMF may be replaced with a mobility management network element, a UDM may be replaced with a data management network element, a UDR may be replaced with a database storage network element, and a PCF may be replaced with a policy control network element. For example, in the following descriptions of embodiments of this application, the AMF may be replaced with a mobility management network element 102, and the PCF may be replaced with a policy control network element 101; or the PCF may be replaced with a policy control network element 101, and the UDR may be replaced with a database storage network element 103.

With reference to the accompanying drawings, the following specifically describes a policy information obtaining method provided in embodiments of this application. It should be noted that a non-roaming scenario is used as an example in embodiments of this application that are to be described below. If the solutions provided in embodiments of this application are applied to a roaming scenario, in embodiments to be described below, a process in which an AMF sends information to a PCF may be adaptively changed to: An AMF sends information to a V-PCF, and then the V-PCF sends the information to an H-PCF. For example, in the following descriptions, the AMF sends first information to the PCF. In this case, if the solutions in embodiments of this application are applied to the roaming scenario, this step is adaptively changed to: The AMF sends first information to the V-PCF, and then the V-PCF sends the first information to the H-PCF. Similarly, if the PCF sends information to the AMF, in the roaming scenario, the H-PCF sends information to the V-PCF, and then the V-PCF sends the information to the AMF. That is, if corresponding to the roaming scenario, a process of interaction between the AMF and the PCF includes a process of interaction between the AMF and the V-PCF and a process of interaction between the V-PCF and the H-PCF. This is applicable to embodiments to be described below. Therefore, details are not described below again.

Figure 8:
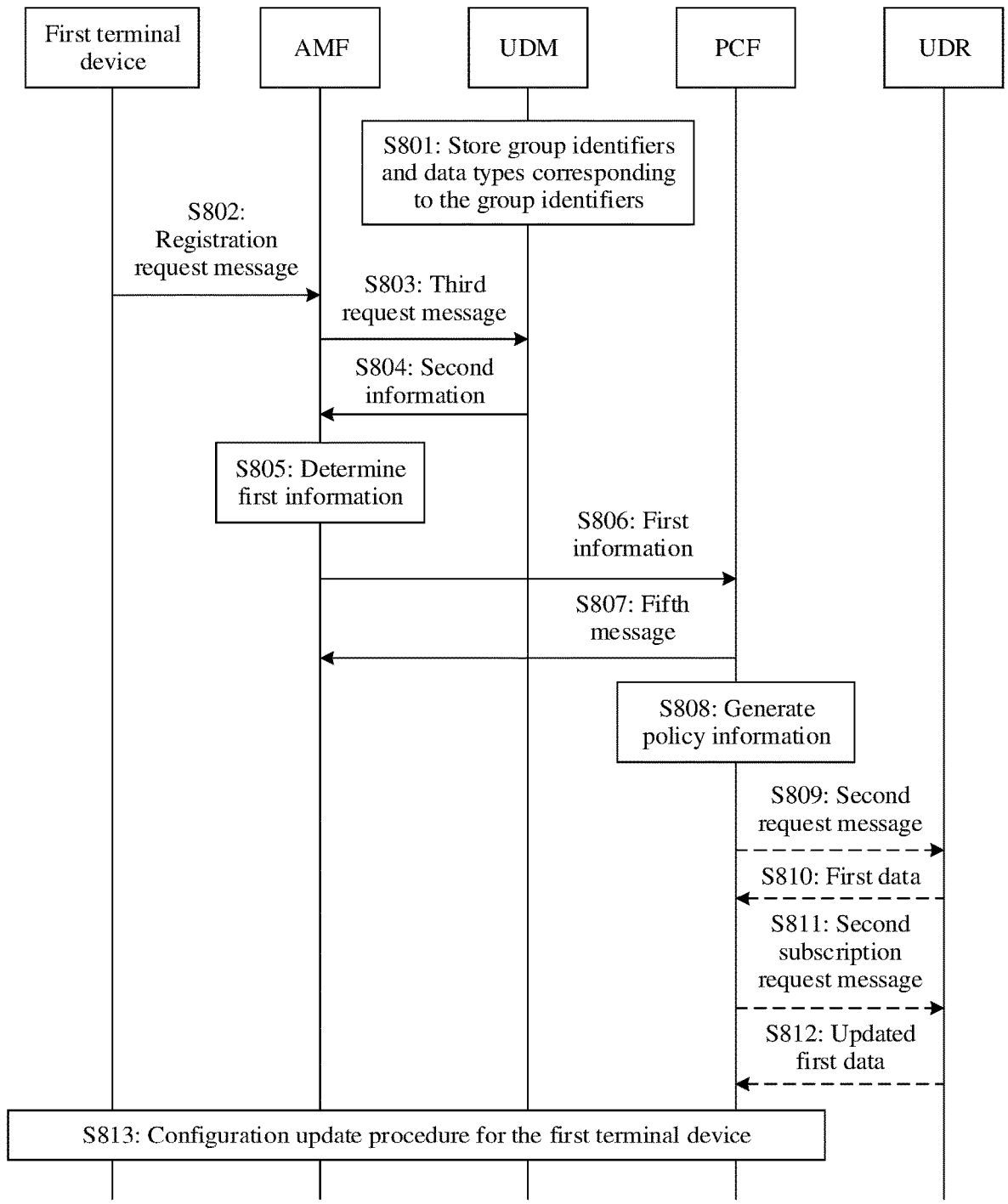
FIG. 8 is a flowchart of a first communication method according to an embodiment of this application.

FIG. 8 is a flowchart of a first communication method according to an embodiment of this application. In a process described below, an example in which the method is applied to the communication system 100 shown in FIG. 1 and the scenario shown in FIG. 2A, FIG. 3, or FIG. 4 is used. The method may be performed by the policy control network element 101 and the first network element 102 included in the communication system 100 provided in the embodiment shown in FIG. 1. In this embodiment of this application, the first network element 102 is, for example, a mobility management network element. In this case, the policy control network element 101 and the first network element 102 are a PCF and an AMF described below. Certainly, in an implementation process of the method, a data management network element and a database storage network element, namely, a UDM and a UDR described below, are further used.

S801: The UDM stores third information, where the third information includes group identifiers and data types corresponding to the group identifiers. For ease of description, a group identifier and a data type corresponding to the group identifier are described as a correspondence between the group identifier and the data type. Therefore, this may be understood as that the third information includes P correspondences, where each of the P correspondences is a correspondence between a group identifier and a data type, and P is a positive integer. For example, if one correspondence is a correspondence between one group identifier and one or more data types, the P correspondences may indicate that there are P group identifiers. The group identifier may be an internal group identifier or an external group identifier of a group. For example, the data type includes a plurality of types such as subscription data, application data, or policy data. Alternatively, the data type may indicate a network element that obtains the group identifier. Alternatively, the data type may be indication information that indicates a type of control performed on the group or indicates a data type of the group.

For example, the UDM may store subscription data of a terminal device based on an operation, administration and maintenance (OAM) configuration; obtain preconfigured subscription data of a terminal device; store subscription data of a terminal device based on a request from an AF; or store subscription data of a terminal device based on information provided by an AF. For example, the UDM may obtain, from the UDR, data types corresponding to the P group identifiers, and correspondingly store the group identifiers and the data types, that is, store the P correspondences.

The data type may be further divided into a plurality of levels. For example, a level of data type includes a subdivided lower-level data type. In this case, a data type indicated by a correspondence in this embodiment of this application may be an upper-level data type, or may be a subdivided lower-level data type.

For example, Table 2 shows an example of the correspondences stored in the UDM. In Table 2, an example in which a group identifier is an internal group identifier is used.

TABLE 2

| Subscription data type | Field (field) | Description |
| --- | --- | --- |
| Access and mobility subscription data | For subscription data | |
| | Internal group identifier list 1 | List of an internal group to which UE belongs (list of the subscribed internal group(s) that the UE belongs to) |
| | For application data | |
| | Internal group identifier list 2 | List of the subscribed internal group(s) that the UE belongs to |
| | Another type (other type) | |
| | Internal group identifier list 3 | List of the subscribed internal group(s) that the UE belongs to |

In Table 2, the access and mobility subscription data may be considered as information used to obtain a group identifier and a corresponding data type, information that indicates a location in which a group identifier and a corresponding data type is stored, or information used to index a group identifier and a corresponding data type. The access and mobility subscription data includes two data types: subscription data and application data, and certainly may further include another data type. Each internal group identifier list in Table 2 may include one or more internal group identifiers. For example, a data type corresponding to one internal group identifier included in the internal group identifier list 1 is subscription data. This may be considered as one correspondence. The correspondence may be understood as that one internal group identifier corresponds to one data type (namely, the data type: subscription data). Table 2 may be considered as including a plurality of correspondences. For another example, internal group identifiers included in different internal group identifier lists may have an intersection. That is, some internal group identifiers may support two or more data types. In this case, one internal group identifier and all data types corresponding to the internal group identifier may be considered as one correspondence. For example, a data type corresponding to one internal group identifier included in the internal group identifier list 1 is subscription data, and the internal group identifier is also included in the internal group identifier list 2, and corresponds to a data type: application data. In this case, the internal group identifier and all corresponding data types are considered as one correspondence. The correspondence may be understood as that one internal group identifier corresponds to two data types (namely, the two data types: subscription data and application data).

For another example, Table 3 shows another example of the correspondences stored in the UDM. In Table 3, an example in which a group identifier is an internal group identifier is used.

TABLE 3

| Subscription data type | Field | Description |
| --- | --- | --- |
| Access and mobility subscription data Policy control subscription data | Internal group identifier list 4 For subscription data: Internal group identifier list 5 For application data: Internal group identifier list 6 | List of the subscribed internal group(s) that the UE belongs to List of the subscribed internal group(s) that the UE belongs to List of the subscribed internal group(s) that the UE belongs to |

In Table 3, the access and mobility subscription data is a data type. The policy control subscription data may be considered as information used to obtain a group identifier and a corresponding data type, information that indicates a location in which a group identifier and a corresponding data type is stored, or information used to index a group identifier and a corresponding data type. The policy control subscription data includes two data types: subscription data and application data. Each internal group identifier list in Table 3 may include one or more internal group identifiers. For example, a data type corresponding to one internal group identifier included in the internal group identifier list 4 is access and mobility subscription data. This may be considered as one correspondence. The correspondence may be understood as that one internal group identifier corresponds to one data type (namely, the data type: access and mobility subscription data). For another example, a data type corresponding to one internal group identifier included in the internal group identifier list 5 is subscription data. This may be considered as one correspondence. The correspondence may be understood as that one internal group identifier corresponds to one data type (namely, the data type: subscription data). Therefore, Table 3 may be considered as including a plurality of correspondences. For another example, internal group identifiers included in different internal group identifier lists may have an intersection. That is, some internal group identifiers may support two or more data types. In this case, one internal group identifier and all data types corresponding to the internal group identifier may be considered as one correspondence. For this example, refer to descriptions of Table 2.

For still another example, Table 4 shows still another example of the correspondences stored in the UDM. In Table 4, an example in which a group identifier is an internal group identifier is used.

TABLE 4

| Subscription data type | Field | Description |
| --- | --- | --- |
| Access and mobility subscription data | For policy data: Internal group identifier list 7 | List that is used for application data and that is of an internal group to which UE belongs (list of the subscribed internal group(s) that the UE belongs to for application data) |
| | Internal group identifier list 8 | List that is used for subscription data and that is of an internal group to which UE belongs (list of the subscribed internal group(s) that the UE belongs to for subscription data) |

In Table 4, the access and mobility subscription data may be considered as information used to obtain a group identifier and a corresponding data type, information that indicates a location in which a group identifier and a corresponding data type is stored, or information used to index a group identifier and a corresponding data type. The policy data may indicate information about a network element that needs to obtain a group identifier and a corresponding data type. For example, the policy data indicates that the group identifier and the corresponding data type need to be sent to the PCF. The policy data included in the access and mobility subscription data includes two data types: subscription data and application data. Each internal group identifier list in Table 4 may include one or more internal group identifiers. For example, a data type corresponding to one internal group identifier included in the internal group identifier list 7 is subscription data. This may be considered as one correspondence. The correspondence may be understood as that one internal group identifier corresponds to one data type (namely, the data type: subscription data). In this case, Table 4 may be considered as including a plurality of correspondences. For another example, internal group identifiers included in different internal group identifier lists may have an intersection. That is, some internal group identifiers may support two or more data types. In this case, one internal group identifier and all data types corresponding to the internal group identifier may be considered as one correspondence. For this example, refer to descriptions of Table 2.

The foregoing several manners of storing the correspondences are merely examples. A manner in which the UDM stores the correspondences is not limited in this embodiment of this application.

S802: A first terminal device sends a registration request message to the AMF, and the AMF receives the registration request message from the first terminal device.

The registration request message includes a UE policy container and an identifier of the first terminal device. Optionally, the registration request message may further include capability information or type information of the first terminal device. The capability information of the first terminal device may indicate a capability of the first terminal device, for example, indicate that the first terminal device is a narrowband terminal device. The type information of the first terminal device may indicate a type of the first terminal device, for example, indicate that the first terminal device is an internet of things (IoT) terminal device. The capability information of the first terminal device and the type information of the first terminal device may be same information, but have different names, or the capability information of the first terminal device and the type information of the first terminal device may be different information. For the UE policy container, refer to descriptions of the procedure shown in FIG. 7.

S803: The AMF sends a third request message to the UDM, and the UDM receives the third request message from the AMF. The third request message may request to obtain subscription information of the first terminal device.

For example, the third request message may be a UE subscription information request message. The AMF may invoke a service provided by the UDM, to send Nudm_SDM_Get_Request to the UDM. Nudm_SDM_Get_Request may be used as the UE subscription information request message.

S804: The UDM sends second information to the AMF, and the AMF receives the second information from the UDM. For example, the second information includes group identifiers and data types corresponding to the group identifiers. Alternatively, this is understood as that the second information includes N correspondences, where each of the N correspondences is a correspondence between one group identifier and one or more data types, the first terminal device belongs to each group corresponding to the N correspondences, and N is a positive integer less than or equal to P. The second information is a subset of the third information. The second information may include all or some of content of the third information. This may be understood as that the third information includes P correspondences, and the second information includes N correspondences, where the N correspondences belong to the P correspondences. If N=P, the second information includes all the content of the third information. If N<P, the second information includes some of the content of the third information.

The UDM may send, to the AMF, a corresponding message including the second information. For example, the third request message may be the UE subscription information request message. The UDM may include the second information in a UE subscription information response message. For example, the UDM may invoke the service provided by the UDM, to send Nudm_SDM_Get_Response to the AMF. Nudm_SDM_Get_Response may be used as the UE subscription information response message.

For example, after receiving the third request message, the UDM may determine, based on the identifier of the first terminal device, a group to which the first terminal device belongs. The first terminal device may belong to one or more groups. For example, the UDM determines that the first terminal device belongs to N groups, where N is a positive integer less than or equal to P. The UDM determines a correspondence of each of the N groups to which the first terminal device belongs. For example, one group may correspond to one correspondence. The first terminal device belongs to the N groups. In this case, the UDM may determine N correspondences, where the N correspondences may belong to the P correspondences, that is, N is less than or equal to P. Because the UDM does not need to perform further determining, the UDM may send all the N correspondences to the AMF, where the second information includes the N correspondences.

S805: The AMF determines first information, where the first information is a subset of the second information. For example, the subset is referred to as a first subset. The first information includes a correspondence to be sent by the AMF to the PCF.

For example, the registration request message does not include the capability information or the type information of the first terminal device. Alternatively, the registration request message includes the capability information or the type information of the first terminal device, but the capability information or the type information of the first terminal device is included in the UE policy container. Consequently, the AMF cannot obtain the capability information or the type information of the first terminal device. In this case, the AMF may determine to send all the N correspondences to the PCF. Therefore, the first subset includes all content of the second information. Alternatively, even if the registration request message does not include the capability information or the type information of the first terminal device, the AMF may still determine the first information based on the second information. For example, the AMF may determine the first information based on the data types included in the second information.

Alternatively, the registration request message includes the capability information or the type information of the first terminal device, and the capability information or the type information of the first terminal device is not included in the UE policy container, so that the AMF can obtain the capability information or the type information of the first terminal device through parsing. In this case, the AMF may determine the first information (namely, the first subset) based on the capability information or the type information of the first terminal device; determine the first information (namely, the first subset) based on the data types included in the second information; or determine the first information (namely, the first subset) based on the capability information or the type information of the first terminal device and the data types included in the second information. That the AMF determines the first information based on the capability information or the type information of the first terminal device may be considered as a determining manner 1. That the AMF determines the first information based on the data types may be considered as a determining manner 2. In conclusion, the AMF may determine the first information in the determining manner 1; determine the first information in the determining manner 2; or determine the first information in the determining manner 1 and the determining manner 2.

The determining manner 1 is determining, based on the capability information or the type information of the first terminal device, that the first terminal device supports a data type corresponding to the first subset but does not support a data type corresponding to the second subset of the second information. The second subset includes remaining information in the second information other than the first subset. For example, the second information includes the N correspondences. The first subset includes, for example, M correspondences in the N correspondences, where M is a positive integer less than or equal to N. The second subset may include (N-M) correspondences. For a data type that is not supported by the first terminal device, the AMF may not send a correspondence between the data type and a group identifier to the PCF. A reason is that even if the PCF generates a policy corresponding to the data type, the first terminal device cannot use the policy. That is, the PCF performs useless functions. For a data type supported by the first terminal device, the AMF may send a correspondence between the data type and a group identifier to the PCF, so that the PCF may generate a corresponding policy for the first terminal device to use.

The determining manner 2 is determining, based on the data types included in the second information (or based on the data types corresponding to the second information), that the PCF requires a data type corresponding to the first subset but does not require a data type corresponding to the second subset. For example, if the PCF needs to generate policy information of the first terminal device based on data corresponding to a data type, it is considered that the PCF requires the data type. If the PCF does not use data corresponding to a data type when generating policy information of the first terminal device, it is considered that the PCF does not require the data type. For another example, if a data type indicates a control type for a group, for example, indicates that access control is performed on the group, data corresponding to the data type is required by the AMF but is not required by the PCF. If a data type in the data types corresponding to the N correspondences is not a data type required by the PCF, the AMF may not send a correspondence between the data type and a group identifier to the PCF. This reduces signaling overheads, and reduces redundant information obtained by the PCF. If a data type in the data types corresponding to the N correspondences is a data type required by the PCF, the AMF may send a correspondence between the data type and a group identifier to the PCF for use. In the foregoing manner, validity of information sent by the AMF to the PCF can be improved, and it is ensured as much as possible that the policy control network element can accurately obtain data corresponding to the groups to which the terminal device belongs.

The AMF determines the first information in the determining manner 1 and the determining manner 2. In this case, for example, the AMF may first use the determining manner 1, for example, determine one or more correspondences in the N correspondences in the determining manner 1, where the one or more correspondences include all or some of the N correspondences. Then, the AMF determines the first information in the one or more correspondences in the determining manner 2, where the first information includes all or some of the one or more correspondences. For example, N=10. The AMF determines six correspondences in the 10 correspondences in the determining manner 1. Data types corresponding to the remaining four correspondences are not supported by the first terminal device, and data types corresponding to the six correspondences can be supported by the first terminal device. Then, the AMF determines five correspondences in the six correspondences in the determining manner 2. Data types corresponding to the five correspondences are required by the PCF, and a data type corresponding to the remaining one correspondence is not required by the PCF. In this case, the first information includes the five correspondences.

Alternatively, the AMF determines the first information in the determining manner 1 and the determining manner 2. In this case, for example, the AMF may first use the determining manner 2, for example, determine one or more correspondences in the N correspondences in the determining manner 2, where the one or more correspondences include all or some of the N correspondences. Then, the AMF determines the first information in the one or more correspondences in the determining manner 1, where the first information includes all or some of the one or more correspondences. For example, N=10. The AMF determines eight correspondences in the 10 correspondences in the determining manner 2. Data types corresponding to the remaining two correspondences are required by the PCF, and data types corresponding to the eight correspondences are not required by the PCF. Then, the AMF determines five correspondences in the eight correspondences in the determining manner 2. Data types corresponding to the five correspondences can be supported by the first terminal device, and a data type corresponding to the remaining one correspondence is not supported by the first terminal device. In this case, the first information includes the five correspondences.

S806: The AMF sends the first information to the PCF, and the PCF receives the first information from the AMF. For example, the first information includes M correspondences in the N correspondences. Optionally, because the first terminal device is performing a registration process, the AMF may further send registration information of the first terminal device to the PCF. The registration information of the first terminal device includes, for example, one or more of the following: an SUPI of the first terminal device, an access type of the first terminal device, a radio access type of the first terminal device, a PEI of the first terminal device, a time zone of the first terminal device, or a serving network of the first terminal device. For the information included in the registration information, refer to related descriptions of the procedure shown in FIG. 7.

For example, if the AMF neither uses the determining manner 1 nor the determining manner 2 for the second information, but sends the M correspondences to the PCF, the M correspondences are the N correspondences, that is, M=N. Alternatively, if the AMF uses the determining manner 1, the determining manner 2, or the determining manner 1 and the determining manner 2, the M correspondences may be a subset of the N correspondences. For example, M may be a positive integer less than or equal to N.

For example, the AMF may send, to the PCF, a message (for example, referred to as a fourth message) including the first information and the registration information. This reduces signaling overheads. For example, the fourth message is a UE policy association establishment request message. The UE policy association establishment request message may request to provide the policy information for the first terminal device. The AMF may invoke a service provided by the PCF, and send Npcf_UEPolicyControl_Create_Request to the PCF. Npcf_UEPolicyControl_Create_Request may be used as the UE policy association establishment request message. Alternatively, the fourth message may be another message.

S807: The PCF sends a fifth message to the AMF, and the AMF receives the fifth message from the PCF.

For example, if the AMF sends the fourth message to the PCF, and the fourth message is a UE policy association establishment request message, the fifth message may be a UE policy association establishment response message. The PCF may invoke the service provided by the PCF, and send Npcf_UEPolicyControl_Create_Response to the AMF. Npcf_UEPolicyControl_Create_Response may be used as the UE policy association establishment response message.

S808: The PCF generates the policy information based on data corresponding to data types corresponding to the M correspondences.

For example, the PCF may generate one piece of policy information based on one data type. In this case, if the PCF needs to generate policy information based on a plurality of data types, the PCF generates a plurality of pieces of policy information. For example, the policy information generated by the PCF may be used in a process such as setting up a PDU session by the terminal device. The one or more pieces of policy information generated by the PCF are applicable to the first terminal device. In addition, the PCF generates the one or more pieces of policy information based on data corresponding to all the data types corresponding to the M correspondences. For example, the M correspondences correspond to M groups. In this case, in addition to being applicable to the first terminal device, the one or more pieces of policy information generated by the PCF are further applicable to all or some of terminal devices included in the M groups.

After the PCF obtains the M correspondences, for a data type indicated by each of the M correspondences, the PCF may determine whether the PCF stores data corresponding to the data type. If the PCF stores the data corresponding to the data type, the PCF may generate corresponding policy information based on the corresponding data. If the PCF does not store the data corresponding to the data type, the PCF needs to obtain the data corresponding to the data type. Data corresponding to different data types may be stored in different UDRs, and the PCF can know in advance a UDR and a data type stored in the UDR, that is, know which UDR is used and which data type is stored in the UDR. Therefore, the PCF may determine a corresponding UDR based on the data type, obtain data corresponding to the data type from the UDR, and then perform S808. Therefore, if the PCF does not store the data corresponding to the data type, the PCF further needs to perform the following S809 and S810 before generating the policy information corresponding to the data type. After S809 and S810, the PCF may generate the policy information corresponding to the data type. It can be learned that S809 and S810 are optional steps, and are represented by dashed lines in FIG. 8.

Further, the PCF may determine generated policy information based on the capability information or the type information of the first terminal device. For example, if the first terminal device supports use of data corresponding to a data type, the PCF generates policy information based on the corresponding data. If the first terminal device does not support use of data corresponding to a data type, the PCF may not need to generate policy information based on the corresponding data. In this way, the generated policy information can better meet a requirement of the terminal device.

S809: The PCF sends a second request message to the UDR, and the UDR receives the second request message from the PCF. The second request message may include a group identifier, to request to obtain data corresponding to a data type corresponding to the group identifier.

For example, if the PCF determines that a data type is not stored, the PCF may determine a group identifier corresponding to the data type, and send the group identifier to the UDR, to obtain data corresponding to the data type corresponding to the group identifier. The second request message may include only one group identifier. If the PCF needs to obtain data corresponding to a plurality of group identifiers, the PCF may send a plurality of second request messages to the UDR. Alternatively, the second request message may include a plurality of group identifiers. For example, if data types corresponding to the plurality of group identifiers are all stored in a same UDR, the PCF may send only one second request message that includes the plurality of group identifiers to the UDR. In this way, the PCF can request, at a time, to obtain data corresponding to a plurality of data types without sending excessive messages. This helps reduce signaling overheads.

For example, the second request message may be an application/subscription information obtaining request message.

S810: The UDR sends the first data to the PCF, and the PCF receives the first data from the UDR. The first data is data corresponding to a data type requested by using the second request message.

For example, if the second request message includes only one group identifier, the first data is data corresponding to a data type corresponding to the group identifier. Alternatively, if the second request message includes a plurality of group identifiers, the first data may include data corresponding to data types corresponding to the plurality of group identifiers.

S811: The PCF sends a second subscription request message to the UDR, and the UDR receives the second subscription request message from the PCF. The second subscription request message may request to subscribe to an update notification of the first data. For example, the second subscription request message may include a group identifier corresponding to the first data, indicating that the second subscription request message requests to subscribe to updated data of a group corresponding to the group identifier.

To obtain the updated data of the group in a timely manner, the PCF may initiate subscription to the UDR. In this case, if group data of a subscribed group is updated subsequently, the UDR can actively send the updated group data to the PCF without a request sent by the PCF. This helps reduce signaling overheads.

For example, the PCF may perform separate subscription for different group identifiers. If the PCF needs to subscribe to updated data of groups corresponding to a plurality of group identifiers, the PCF may separately send a second subscription request message to the UDR. Alternatively, if data types corresponding to a plurality of group identifiers correspond to a same UDR, the PCF may perform unified subscription for the plurality of group identifiers. That is, the second subscription request message sent by the PCF to the UDR may include the plurality of group identifiers. In this way, the PCF can subscribe to updated data of a plurality of groups at a time without sending excessive second subscription request messages to the UDR. This helps reduce signaling overheads. If the second subscription request message sent by the PCF to the UDR includes a plurality of group identifiers, the UDR can send updated data to the PCF provided that group data of a group corresponding to one of the group identifiers is updated.

S811 is merely an optional step, and is represented by a dashed line in FIG. 8.

S812: The UDR sends updated first data to the PCF, and the PCF receives the updated first data from the UDR.

The second subscription request message requests to subscribe to the update notification of the first data. If the first data is updated, the UDR may send the updated first data to the PCF without a request of the PCF.

In this embodiment of this application, the policy control network element can obtain a group identifier and a data type corresponding to the group identifier, so that the policy control network element can subscribe to data corresponding to the corresponding group identifier. The data type corresponds to the group identifier, that is, corresponds to a group indicated by the group identifier. Therefore, the data type is applicable to one or more terminal devices included in the group. If another terminal device subsequently initiates registration, and the terminal device also supports the data type, the policy control network element does not need to request to obtain the data corresponding to the data type again. This simplifies an operation of the policy control network element, and reduces power consumption of the policy control network element.

S812 is also merely an optional step, and is represented by a dashed line in FIG. 8.

S813: The PCF initiates a configuration update procedure for the first terminal device, to send the one or more pieces of policy information generated in S808 to the first terminal device.

In this embodiment of this application, the policy control network element can obtain a group identifier and a data type corresponding to the group identifier, so that the policy control network element can request data corresponding to the data type. The data type corresponds to the group identifier, that is, corresponds to a group indicated by the group identifier. Therefore, the data type is applicable to one or more terminal devices included in the group. By using this solution, it can be ensured that the policy control network element can accurately obtain data corresponding to the group to which the terminal devices belong. Further, if another terminal device subsequently initiates registration, and the terminal device also belongs to the group, the policy control network element does not need to request to obtain the data corresponding to the data type again. This simplifies an operation of the policy control network element, and reduces power consumption of the policy control network element. In addition, the PCF can generate the policy information based on the data corresponding to the data type. The data type corresponds to the group identifier, that is, corresponds to a group indicated by the group identifier. Therefore, the policy information is applicable to one or more terminal devices included in the group. If another terminal device subsequently initiates registration, and the terminal device is also applicable to the policy information, the PCF may send the policy information to the terminal device without requesting to obtain data of a data type supported by the terminal device and generating policy information for the terminal device again. This simplifies an operation of the PCF, and reduces power consumption of the PCF. In addition, the PCF knows a correspondence between a group identifier and a data type. In other words, the PCF knows a data type, and can determine a corresponding UDR based on the data type. Therefore, the PCF may subscribe to updated data of a corresponding group from the UDR. If a terminal device in the group initiates registration again, the PCF may generate policy information of the terminal device based on the updated data of the group from the UDR without requesting the updated data from the UDR again. This simplifies an operation process of the PCF.

Figure 9:
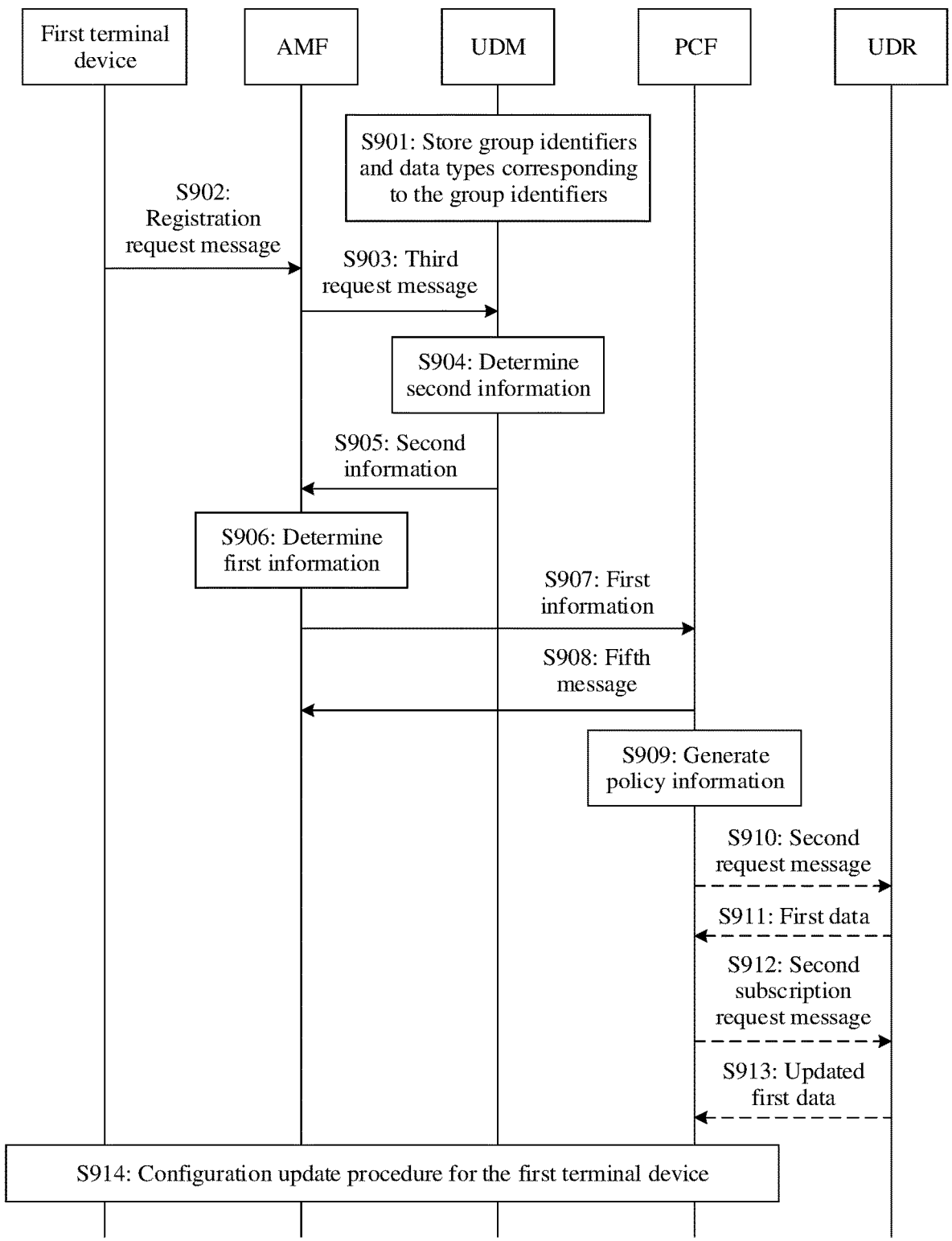
FIG. 9 is a flowchart of a second communication method according to an embodiment of this application.

To resolve a same technical problem, an embodiment of this application provides a second communication method. FIG. 9 is a flowchart of the method. In a process described below, an example in which the method is applied to the communication system 100 shown in FIG. 1 and the scenario shown in FIG. 2A, FIG. 3, or FIG. 4 is used. The method may be performed by the policy control network element 101 and the first network element 102 included in the communication system 100 provided in the embodiment shown in FIG. 1. In this embodiment of this application, the first network element 102 is, for example, a mobility management network element. In this case, the policy control network element 101 and the first network element 102 are a PCF and an AMF described below. Certainly, in an implementation process of the method, a data management network element and a database storage network element, namely, a UDM and a UDR described below, are further used.

S901: The UDM stores third information, where the third information includes group identifiers and data types corresponding to the group identifiers. For ease of description, a group identifier and a data type corresponding to the group identifier are described as a correspondence between the group identifier and the data type. Therefore, this may be understood as that the third information includes P correspondences, where each of the P correspondences is a correspondence between a group identifier and a data type, and P is a positive integer. For example, one correspondence is a correspondence between one group identifier and one or more data types.

For more content of S901, refer to S801 in the embodiment shown in FIG. 8.

S902: A first terminal device sends a registration request message to the AMF, and the AMF receives the registration request message from the first terminal device.

For more content of S902, refer to S802 in the embodiment shown in FIG. 8.

S903: The AMF sends a third request message to the UDM, and the UDM receives the third request message from the AMF. The third request message may request to obtain subscription information of the first terminal device. Optionally, the third request message may further include capability information or type information of the first terminal device. In other words, the capability information or the type information of the first terminal device is not included in a UE policy container. The AMF obtains the capability information or the type information of the first terminal device from the registration request message, and sends the capability information or the type information of the first terminal device to the UDM.

For more content of S903, refer to S803 in the embodiment shown in FIG. 8.

S904: The UDM determines second information, where the second information is a subset of the third information. The second information includes a correspondence to be sent by the UDM to the AMF.

For example, after receiving the third request message, the UDM may determine, based on an identifier of the first terminal device, a group to which the first terminal device belongs. The first terminal device may belong to one or more groups. The UDM determines a correspondence of each group to which the first terminal device belongs. For example, one group may correspond to one correspondence. For example, the first terminal device belongs to K groups. In this case, the UDM may determine K correspondences, where the K correspondences may belong to the P correspondences, that is, K is a positive integer less than or equal to P.

For example, the third request message does not include the capability information or the type information of the first terminal device. Alternatively, the third request message includes the capability information or the type information of the first terminal device, but the capability information or the type information of the first terminal device is included in the UE policy container. Consequently, the UDM cannot obtain the capability information or the type information of the first terminal device. In this case, the UDM may determine to send all the K correspondences to the PCF. Therefore, the second information includes all content of the third information.

Alternatively, the third request message includes the capability information or the type information of the first terminal device, and the capability information or the type information of the first terminal device is not included in the UE policy container, so that the UDM can obtain the capability information or the type information of the first terminal device through parsing. In this case, the UDM may determine the second information based on the capability information or the type information of the first terminal device. In other words, the UDM may determine the second information in the determining manner 1 described in the embodiment shown in FIG. 8. For example, the UDM may determine the second information in the determining manner 1. To be specific, the UDM may determine that the first terminal device supports a data type corresponding to the second information but does not support a data type corresponding to fourth information, where the fourth information is remaining information in the third information other than the second information. For a data type that is not supported by the first terminal device, the UDM may not send a correspondence between the data type and a group identifier to the AMF. A reason is that even if the PCF generates a policy corresponding to the data type, the first terminal device cannot use the policy. That is, the PCF performs useless functions. For a data type supported by the first terminal device, the UDM may send a correspondence between the data type and a group identifier to the AMF, and then the AMF sends the correspondence to the PCF, so that the PCF may generate a corresponding policy for the first terminal device to use. In the embodiment shown in FIG. 8, the determining process may be performed by the AMF. However, in the embodiment shown in FIG. 9, the determining process may be performed by the UDM. In this way, the AMF does not need to perform the determining process again, so that load of the AMF is reduced.

S905: The UDM sends the second information to the AMF, and the AMF receives the second information from the UDM. The second information may include N correspondences, where each of the N correspondences is a correspondence between one group identifier and one or more data types, the first terminal device belongs to each group corresponding to the N correspondences, and N is a positive integer. For example, if the third request message is a UE subscription information request message, the UDM may include the second information in a UE subscription information response message. For example, the UDM may invoke a service provided by the UDM, to send Nudm_SDM_Get_Response to the AMF. Nudm_SDM_Get_Response may be used as the UE subscription information response message.

For example, if the UDM does not determine the second information based on the capability information or the type information of the first terminal device, but sends the K correspondences to the AMF, the N correspondences are the K correspondences, that is, K=N. Alternatively, if the UDM determines first information based on the capability information or the type information of the first terminal device, the N correspondences may be a subset of the K correspondences. For example, N may be a positive integer less than or equal to K.

S906: The AMF determines the first information, where the first information is a first subset of the second information. The first information includes a correspondence to be sent by the AMF to the PCF.

For example, because the UDM has performed determining based on the capability information or the type information of the first terminal device, the AMF does not need to perform the determining process again. In this case, the AMF may determine to send all the N correspondences to the PCF. Therefore, the first subset includes all content of the second information.

Alternatively, the AMF may determine the first information (that is, determine the first subset) based on the data types corresponding to the second information. In other words, the AMF may determine the first information in the determining manner 2 described in the embodiment shown in FIG. 8. The determining manner 2 is determining that the PCF requires a data type corresponding to the first subset but does not require a data type corresponding to a second subset. For example, if the PCF needs to generate policy information of the first terminal device based on data corresponding to a data type, it is considered that the PCF requires the data type. If the PCF does not use data corresponding to a data type when generating policy information of the first terminal device, it is considered that the PCF does not require the data type. For another example, if a data type indicates a control type for a group, for example, indicates that access control is performed on the group, data corresponding to the data type is required by the AMF but is not required by the PCF. If a data type in the data types corresponding to the N correspondences is not a data type required by the PCF, the AMF may not send a correspondence between the data type and a group identifier to the PCF. This reduces signaling overheads, and reduces redundant information obtained by the PCF. If a data type in the data types corresponding to the N correspondences is a data type required by the PCF, the AMF may send a correspondence between the data type and a group identifier to the PCF for use. In the foregoing manner, validity of information sent by the AMF to the PCF can be improved, and it is ensured as much as possible that the policy control network element can accurately obtain data corresponding to the groups to which the terminal device belongs.

S907: The AMF sends the first information to the PCF, and the PCF receives the first information from the AMF. For example, the first information includes M correspondences in the N correspondences, where M is a positive integer less than or equal to N. Optionally, because the first terminal device is performing a registration process, the AMF may further send registration information of the first terminal device to the PCF. The registration information of the first terminal device includes, for example, one or more of the following: an SUPI of the first terminal device, an access type of the first terminal device, a radio access type of the first terminal device, a PEI of the first terminal device, a time zone of the first terminal device, or a serving network of the first terminal device. For the information included in the registration information, refer to related descriptions of the procedure shown in FIG. 7.

For example, if the AMF does not determine the first information in the determining manner 2, but sends the N correspondences to the PCF, the M correspondences are the N correspondences, that is, M=N. Alternatively, if the AMF determines the first information in the determining manner 2, the M correspondences may be a subset of the N correspondences. For example, M may be less than or equal to N.

For example, the AMF may send, to the PCF, a message (for example, referred to as a fourth message) including the first information and the registration information. This reduces signaling overheads. For example, the fourth message is a UE policy association establishment request message. The UE policy association establishment request message may request to provide the policy information for the first terminal device. For example, the AMF may invoke a service provided by the PCF, and send Npcf_UEPolicyControl_Create_Request to the PCF. Npcf_UEPolicyControl_Create_Request may be used as the UE policy association establishment request message. Alternatively, the fourth message may be another message.

S908: The PCF sends a fifth message to the AMF, and the AMF receives the fifth message from the PCF.

For more content of S908, refer to S807 in the embodiment shown in FIG. 8.

S909: The PCF generates one or more pieces of policy information based on data corresponding to data types corresponding to the M correspondences.

For more content of S909, refer to S808 in the embodiment shown in FIG. 8.

S910: The PCF sends a second request message to the UDR, and the UDR receives the second request message from the PCF. The second request message may include a group identifier, to request to obtain data corresponding to a data type corresponding to the group identifier.

For more content of S910, refer to S809 in the embodiment shown in FIG. 8.

S911: The UDR sends the first data to the PCF, and the PCF receives the first data from the UDR. The first data may include data corresponding to a data type requested by the PCF by using a second subscription request message.

For more content of S911, refer to S810 in the embodiment shown in FIG. 8.

S912: The PCF sends the second subscription request message to the UDR, and the UDR receives the second subscription request message from the PCF. The second subscription request message may request to subscribe to an update notification of the first data.

For more content of S912, refer to S811 in the embodiment shown in FIG. 8.

S913: The UDR sends updated first data to the PCF, and the PCF receives the updated first data from the UDR.

For more content of S913, refer to S812 in the embodiment shown in FIG. 8.

S914: The PCF initiates a configuration update procedure for the first terminal device, to send the one or more pieces of policy information generated in S909 to the first terminal device.

In this embodiment of this application, the policy control network element can obtain a group identifier and a data type corresponding to the group identifier, so that the policy control network element can request data corresponding to the data type. The data type corresponds to the group identifier, that is, corresponds to a group indicated by the group identifier. Therefore, the data type is applicable to one or more terminal devices included in the group. By using this solution, it can be ensured that the policy control network element can accurately obtain data corresponding to the group to which the terminal devices belong. Further, if another terminal device subsequently initiates registration, and the terminal device also belongs to the group, the policy control network element does not need to request to obtain the data corresponding to the data type again. This simplifies an operation of the policy control network element, and reduces power consumption of the policy control network element. In addition, the PCF can generate the policy information based on the data corresponding to the data type. The data type corresponds to the group identifier, that is, corresponds to a group indicated by the group identifier. Therefore, the policy information is applicable to one or more terminal devices included in the group. If another terminal device subsequently initiates registration, and the terminal device is also applicable to the policy information, the PCF may send the policy information to the terminal device without requesting to obtain data of a data type supported by the terminal device and generating policy information for the terminal device again. This simplifies an operation of the PCF, and reduces power consumption of the PCF. In addition, the PCF knows a correspondence between a group identifier and a data type. In other words, the PCF knows a data type, and can determine a corresponding UDR based on the data type. Therefore, the PCF may subscribe to updated data of a corresponding group from the UDR. If a terminal device in the group initiates registration again, the PCF may generate policy information of the terminal device based on the updated data of the group from the UDR without requesting the updated data from the UDR again. This simplifies an operation process of the PCF. In addition, in this embodiment of this application, a process of performing determining based on the capability information or the type information of the first terminal device is performed on a UDM side. This reduces load of the AMF.

Figure 10:
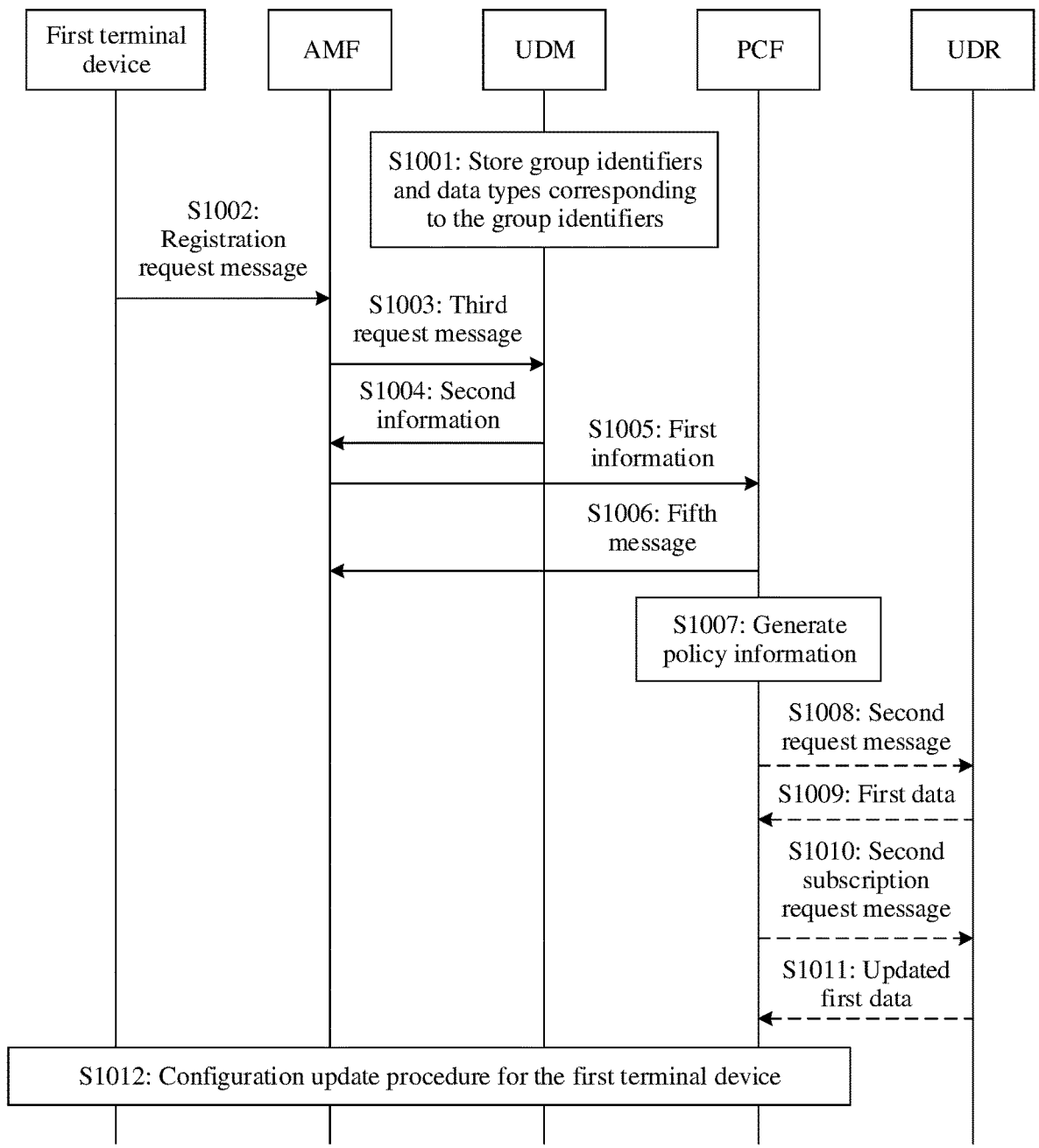
FIG. 10 is a flowchart of a third communication method according to an embodiment of this application.

To resolve a same technical problem, an embodiment of this application provides a third communication method. FIG. 10 is a flowchart of the method. In a process described below, an example in which the method is applied to the communication system 100 shown in FIG. 1 and the scenario shown in FIG. 2A, FIG. 3, or FIG. 4 is used. The method may be performed by the policy control network element 101 and the first network element 102 included in the communication system 100 provided in the embodiment shown in FIG. 1. In this embodiment of this application, the first network element 102 is, for example, a mobility management network element. In this case, the policy control network element 101 and the first network element 102 are a PCF and an AMF described below. Certainly, in an implementation process of the method, a data management network element and a database storage network element, namely, a UDM and a UDR described below, are further used.

S1001: The UDM stores third information, where the third information includes group identifiers and data types corresponding to the group identifiers. For ease of description, a group identifier and a data type corresponding to the group identifier are described as a correspondence between the group identifier and the data type. Therefore, this may be understood as that the third information includes P correspondences, where each of the P correspondences is a correspondence between a group identifier and a data type, and P is a positive integer. For example, if one correspondence is a correspondence between one group identifier and one or more data types, the P correspondences may indicate that there are P group identifiers. The group identifier may be an internal group identifier or an external group identifier of a group. The data type includes, for example, a plurality of types such as subscription data, application data, or policy data.

For more content of S1001, refer to S801 in the embodiment shown in FIG. 8.

S1002: A first terminal device sends a registration request message to the AMF, and the AMF receives the registration request message from the first terminal device.

For more content of S1002, refer to S802 in the embodiment shown in FIG. 8. The registration request message may include capability information or type information of the first terminal device. The capability information or the type information of the first terminal device is included in a UE policy container that cannot be parsed by network elements such as the AMF and the UDM. The container is transparently transmitted to the PCF that can parse the container.

S1003: The AMF sends a third request message to the UDM, and the UDM receives the third request message from the AMF. The third request message may request to obtain subscription information of the first terminal device.

For more content of S1003, refer to S803 in the embodiment shown in FIG. 8.

S1004: The UDM sends second information to the AMF, and the AMF receives the second information from the UDM. For example, the second information includes N correspondences, where each of the N correspondences is a correspondence between one group identifier and one or more data types, the first terminal device belongs to each group corresponding to the N correspondences, and N is a positive integer less than or equal to P. The second information is a subset of the third information. The second information may include all or some of content of the third information. This may be understood as that the third information includes P correspondences, and the second information includes N correspondences, where the N correspondences belong to the P correspondences. If N=P, the second information includes all the content of the third information. If N<P, the second information includes some of the content of the third information. For example, the second information may be included in a UE subscription information response message. The UDM may invoke a service provided by the UDM, to send Nudm_SDM_Get_Response to the AMF. Nudm_SDM_Get_Response may be used as the UE subscription information response message.

For more content of S1004, refer to S804 in the embodiment shown in FIG. 8.

In this embodiment of this application, because the capability information or the type information of the first terminal device is included in the UE policy container that cannot be parsed by the network elements such as the AMF and the UDM, neither the AMF nor the UDM can determine, based on the capability information or the type information of the first terminal device, a data type supported by the first terminal device. In other words, neither the AMF nor the UDM can perform the determining manner 1 described in the embodiment shown in FIG. 8. However, the AMF can obtain the second information. Therefore, the AMF may determine first information in the second information in the determining manner 2 described in the embodiment shown in FIG. 8. Alternatively, the AMF may not determine first information in the determining manner 2, but directly send the second information to the PCF.

S1005: The AMF sends the first information to the PCF, and the PCF receives the first information from the AMF. For example, the first information includes N correspondences. Optionally, because the first terminal device is performing a registration process, the AMF may further send registration information of the first terminal device to the PCF. The registration information of the first terminal device includes, for example, one or more of the following: an SUPI of the first terminal device, an access type of the first terminal device, a radio access type of the first terminal device, a PEI of the first terminal device, a time zone of the first terminal device, or a serving network of the first terminal device. For the information included in the registration information, refer to related descriptions of the procedure shown in FIG. 7.

For example, the AMF may not determine the first information in the determining manner 2, but send the second information to the PCF. In this case, the first information and the second information are same information, for example, both include N correspondences. Alternatively, the AMF may determine the first information in the determining manner 2. In this case, the first information is a subset of the second information. For example, the second information includes N correspondences, and the first information includes M correspondences in the N correspondences, where M is a positive integer less than or equal to N.

For example, the AMF may send, to the PCF, a message (for example, referred to as a fourth message) including the first information and the registration information. This reduces signaling overheads. For example, the fourth message is a UE policy association establishment request message. The UE policy association establishment request message may request to provide policy information for the first terminal device. For example, the AMF may invoke a service provided by the PCF, and send Npcf_UEPolicyControl_Create_Request to the PCF. Npcf_UEPolicyControl_Create_Request may be used as the UE policy association establishment request message. Alternatively, the fourth message may be another message.

S1006: The PCF sends a fifth message to the AMF, and the AMF receives the fifth message from the PCF.

For more content of S1006, refer to S807 in the embodiment shown in FIG. 8.

S1007: The PCF generates the policy information based on data corresponding to data types corresponding to the N correspondences.

For example, after the PCF obtains the N correspondences, for a data type indicated by each of the N correspondences, the PCF may determine whether the PCF stores data corresponding to the data type. If the PCF stores the data corresponding to the data type, the PCF may determine, based on the capability information or the type information of the first terminal device, whether the first terminal device supports the data type. If the PCF determines that the first terminal device supports the data type, the PCF may generate policy information based on the data corresponding to the data type.

Alternatively, if the PCF determines that the first terminal device does not support the data type, the PCF may not generate policy information corresponding to the data type.

Alternatively, if the PCF does not store the data corresponding to the data type, the PCF may determine, based on the capability information or the type information of the first terminal device, whether the first terminal device supports the data type. If the PCF determines that the first terminal device supports the data type, the PCF may determine a UDR corresponding to the data type, obtain the data corresponding to the data type from the UDR, and then generate policy information based on the data corresponding to the data type. Therefore, if the PCF does not store the data corresponding to the data type, and the first terminal device supports the data type, the PCF further needs to perform the following S1009 and S1010 before generating the policy information based on the data corresponding to the data type. After S1009 and S1010, the PCF may generate the policy information based on the data corresponding to the data type. It can be learned that S1009 and S1010 are optional steps, and are represented by dashed lines in FIG. 10. Alternatively, if the PCF determines that the first terminal device supports the data type, the PCF does not need to determine whether the data corresponding to the data type is stored, and does not need to generate policy information corresponding to the data type. If the first terminal device does not support the data type, even if the PCF generates a corresponding policy, the first terminal device cannot use the policy. Therefore, the PCF may not need to generate the corresponding policy. This reduces useless functions performed by the PCF.

Alternatively, if the PCF does not store the data corresponding to the data type, the PCF may determine a UDR corresponding to the data type, and obtain the data corresponding to the data type from the UDR. Then, the PCF may determine, based on the capability information or the type information of the first terminal device, whether the first terminal device supports use of the data corresponding to the data type. If the PCF determines that the first terminal device supports use of the data corresponding to the data type, the PCF may generate policy information based on the data corresponding to the data type. If the PCF determines that the first terminal device does not support use of the data corresponding to the data type, the PCF does not need to generate policy information based on the data corresponding to the data type. Even if the first terminal device does not support use of the data corresponding to the data type, another terminal device in the groups to which the first terminal device belongs may support use of the data corresponding to the data type, so that the PCF obtains the data corresponding to the data type. Although the data is not used when the policy information is generated this time, the data may be used when policy information is generated for another terminal device in the groups subsequently. In this case, the PCF does not need to request the data from the UDR again, so that a shorter time period is required for generating the policy information, and higher efficiency is ensured.

S1008: The PCF sends a second request message to the UDR, and the UDR receives the second request message from the PCF. The second request message may include a group identifier, to request to obtain data corresponding to a data type corresponding to the group identifier.

For more content of S1008, refer to S809 in the embodiment shown in FIG. 8.

S1009: The UDR sends the first data to the PCF, and the PCF receives the first data from the UDR. The first data is data corresponding to a data type requested by using a second subscription request message.

For more content of S1009, refer to S810 in the embodiment shown in FIG. 8.

S1010: The PCF sends the second subscription request message to the UDR, and the UDR receives the second subscription request message from the PCF. The second subscription request message may request to subscribe to an update notification of the first data. For example, the second subscription request message may include a group identifier corresponding to the first data, indicating that the second subscription request message requests to subscribe to updated data of a group corresponding to the group identifier.

For more content of S1010, refer to S811 in the embodiment shown in FIG. 8.

S1011: The UDR sends updated first data to the PCF, and the PCF receives the updated first data from the UDR.

For more content of S1011, refer to S812 in the embodiment shown in FIG. 8.

S1012: The PCF initiates a configuration update procedure for the first terminal device, to send the one or more pieces of policy information generated in S1009 to the first terminal device.

In this embodiment of this application, the policy control network element can obtain a group identifier and a data type corresponding to the group identifier, so that the policy control network element can request data corresponding to the data type. The data type corresponds to the group identifier, that is, corresponds to a group indicated by the group identifier. Therefore, the data type is applicable to one or more terminal devices included in the group. By using this solution, it can be ensured that the policy control network element can accurately obtain data corresponding to the group to which the terminal devices belong. Further, if another terminal device subsequently initiates registration, and the terminal device also belongs to the group, the policy control network element does not need to request to obtain the data corresponding to the data type again. This simplifies an operation of the policy control network element, and reduces power consumption of the policy control network element. In addition, the PCF can generate the policy information based on the data corresponding to the data type. The data type corresponds to the group identifier, that is, corresponds to a group indicated by the group identifier. Therefore, the policy information is applicable to one or more terminal devices included in the group. If another terminal device subsequently initiates registration, and the terminal device is also applicable to the policy information, the PCF may send the policy information to the terminal device without requesting to obtain data of a data type supported by the terminal device and generating policy information for the terminal device again. This simplifies an operation of the PCF, and reduces power consumption of the PCF. In addition, the PCF knows a correspondence between a group identifier and a data type. In other words, the PCF knows a data type, and can determine a corresponding UDR based on the data type. Therefore, the PCF may subscribe to updated data of a corresponding group from the UDR. If a terminal device in the group initiates registration again, the PCF may generate policy information of the terminal device based on the updated data of the group from the UDR without requesting the updated data from the UDR again. This simplifies an operation process of the PCF. In addition, in this embodiment of this application, a process of performing determining based on the capability information or the type information of the first terminal device is performed on a PCF side. This reduces load of the AMF and the UDM.

Figure 11:
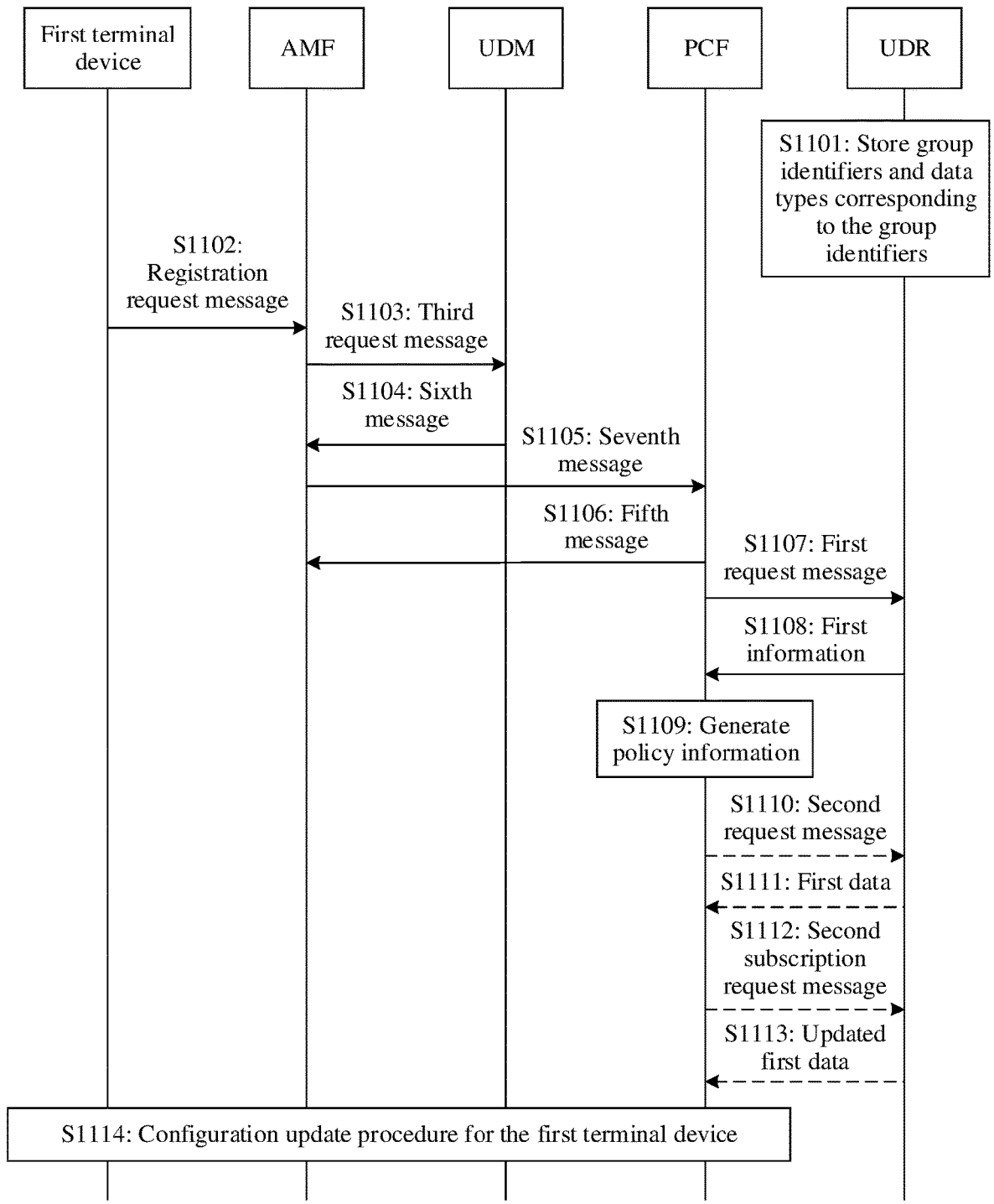
FIG. 11 is a flowchart of a fourth communication method according to an embodiment of this application.

To resolve a same technical problem, an embodiment of this application provides a fourth communication method. FIG. 11 is a flowchart of the method. In a process described below, an example in which the method is applied to the communication system 100 shown in FIG. 1 and the scenario shown in FIG. 2A, FIG. 3, or FIG. 4 is used. The method may be performed by the policy control network element 101 and the first network element 102 included in the communication system 100 provided in the embodiment shown in FIG. 1. In this embodiment of this application, the first network element 102 is, for example, a database storage network element. In this case, the policy control network element 101 and the first network element 102 are a PCF and a UDR described below. Certainly, in an implementation process of the method, a data management network element and a mobility management network element, namely, a UDM and an AMF described below, are further used.

S1101: The UDR stores third information, where the third information includes group identifiers and data types corresponding to the group identifiers. For ease of description, a group identifier and a data type corresponding to the group identifier are described as a correspondence between the group identifier and the data type. Therefore, this may be understood as that the third information includes P correspondences, where each of the P correspondences is a correspondence between a group identifier and a data type, and P is a positive integer. For example, one correspondence is a correspondence between one group identifier and one or more data types.

In the foregoing embodiments, the P correspondences are stored in the UDM. However, in this embodiment of this application, the P correspondences are stored in the UDR. The UDR is originally configured to store information such as subscription data of a terminal device. The UDR stores the P correspondences, so that storage space of the UDM can be saved.

For content such as a manner in which the UDR stores the P correspondences, or an implementation of the correspondences, refer to S801 in the embodiment shown in FIG. 8.

S1102: A first terminal device sends a registration request message to the AMF, and the AMF receives the registration request message from the first terminal device.

The registration request message includes a UE policy container and an identifier of the first terminal device. Optionally, the registration request message may further include capability information or type information of the first terminal device. Further, optionally, the capability information or the type information of the first terminal device is included in the UE policy container that cannot be parsed by network elements such as the AMF and the UDM. The container is transparently transmitted to the PCF that can parse the container.

For more content of S1102, refer to S1002 in the embodiment shown in FIG. 10.

S1103: The AMF sends a third request message to the UDM, and the UDM receives the third request message from the AMF. The third request message may request to obtain subscription information of the first terminal device.

For more content of S1103, refer to S1003 in the embodiment shown in FIG. 10.

S1104: The UDM sends a sixth message to the AMF, and the AMF receives the sixth message from the UDM. For example, the sixth message is a UE subscription information response message. The UDM may invoke a service provided by the UDM, to send Nudm_SDM_Get_Response to the AMF. Nudm_SDM_Get_Response may be used as the UE subscription information response message. For example, the sixth message may include the subscription information of the first terminal device. However, because the UDM does not store a correspondence between a group identifier and a data type, the sixth message does not include the correspondence.

For more content of S1104, refer to S1004 in the embodiment shown in FIG. 10.

S1105: The AMF sends a seventh message to the PCF, and the PCF receives the seventh message from the AMF. Optionally, because the first terminal device is performing a registration process, the seventh message may include registration information of the first terminal device. The registration information includes, for example, one or more of the following: an SUPI of the first terminal device, an access type of the first terminal device, a radio access type of the first terminal device, a PEI of the first terminal device, a time zone of the first terminal device, or a serving network of the first terminal device. For the information included in the registration information, refer to related descriptions of the procedure shown in FIG. 7.

Because the UDM does not store the correspondence between the group identifier and the data type, the sixth message does not include the correspondence. Therefore, the eighth message does not include the correspondence either.

For more content of S1105, refer to S1005 in the embodiment shown in FIG. 10.

S1106: The PCF sends a fifth message to the AMF, and the AMF receives the fifth message from the PCF. The fifth message is a response message of the seventh message.

For more content of S1106, refer to S1006 in the embodiment shown in FIG. 10.

S1107: The PCF sends a first request message to the UDR, and correspondingly, the UDR receives the first request message from the PCF. The first request message may request to obtain the correspondence between the group identifier and the data type, or may request to obtain the subscription information of the first terminal device.

For example, the first request message is a UE subscription information obtaining request message.

S1108: The UDR sends first information to the PCF, and correspondingly, the PCF receives the first information from the UDR. The first information may include N correspondences, where each of the N correspondences is a correspondence between one group identifier and one or more data types, the first terminal device belongs to each group corresponding to the N correspondences, and N is a positive integer less than or equal to P. The first information is a subset of the third information. The first information may include all or some of content of the third information. This may be understood as that the third information includes P correspondences, and the first information includes N correspondences, where the N correspondences belong to the P correspondences. If N=P, the first information includes all the content of the third information. If N<P, the first information includes some of the content of the third information.

For example, after receiving the first request message, the UDR may determine, based on the identifier of the first terminal device, a group to which the first terminal device belongs. The first terminal device may belong to one or more groups. The UDR determines a correspondence of each group to which the first terminal device belongs. For example, one group may correspond to one correspondence. The first terminal device belongs to N groups. In this case, the UDR may determine N correspondences, where the N correspondences may belong to the P correspondences, that is, N is less than or equal to P. In this case, the UDR may send the N correspondences to the PCF.

Alternatively, S1107 may not be performed. To be specific, the PCF does not need to request the correspondence between the group identifier and the data type from the UDR. For example, the PCF sends a first subscription request message to the UDR in advance, where the first subscription request message is used to subscribe to the subscription information of the first terminal device. In other words, the PCF subscribes to an update notification of the subscription information of the first terminal device from the UDR in advance. In this case, if the subscription information of the first terminal device is updated, the UDR sends updated subscription information to the PCF. For example, the updated subscription information includes the first information. In this case, the UDR may send the first information to the PCF based on the first subscription request message without a request from the PCF. Therefore, S1107 is an optional step, and is not necessarily performed. Alternatively, in this case, S1107 may be performed. However, the first request message in S1107 does not request to obtain the correspondence between the group identifier and the data type, but is used to subscribe to the subscription information of the first terminal device or an update notification of the subscription information of the first terminal device. Alternatively, the subscription process of the PCF may be performed in another time period, and may not be performed in S1107.

S1109: The PCF generates policy information based on data corresponding to data types corresponding to the N correspondences.

For more content of S1109, refer to S1007 in the embodiment shown in FIG. 10.

S1110: The PCF sends a second request message to the UDR, and the UDR receives the second request message from the PCF. The second request message may include a group identifier, to request to obtain data corresponding to a data type corresponding to the group identifier.

For more content of S1110, refer to S1008 in the embodiment shown in FIG. 10.

S1111: The UDR sends first data to the PCF, and the PCF receives the first data from the UDR. The first data may include data corresponding to a data type requested by using a second subscription request message.

For more content of S1111, refer to S1009 in the embodiment shown in FIG. 10.

S1112: The PCF sends the second subscription request message to the UDR, and the UDR receives the second subscription request message from the PCF. The second subscription request message may request to subscribe to an update notification of the first data. For example, the second subscription request message may include a group identifier corresponding to the first data, indicating that the second subscription request message requests to subscribe to updated data of a group corresponding to the group identifier.

For more content of S1112, refer to S1010 in the embodiment shown in FIG. 10.

S1113: The UDR sends updated first data to the PCF, and the PCF receives the updated first data from the UDR.

For more content of S1113, refer to S1011 in the embodiment shown in FIG. 10.

S1114: The PCF initiates a configuration update procedure for the first terminal device, to send the one or more pieces of policy information generated in S1009 to the first terminal device.

In this embodiment of this application, the policy control network element can obtain a group identifier and a data type corresponding to the group identifier, so that the policy control network element can request data corresponding to the data type. The data type corresponds to the group identifier, that is, corresponds to a group indicated by the group identifier. Therefore, the data type is applicable to one or more terminal devices included in the group. By using this solution, it can be ensured that the policy control network element can accurately obtain data corresponding to the group to which the terminal devices belong. Further, if another terminal device subsequently initiates registration, and the terminal device also belongs to the group, the policy control network element does not need to request to obtain the data corresponding to the data type again. This simplifies an operation of the policy control network element, and reduces power consumption of the policy control network element. In addition, the PCF can generate the policy information based on the data corresponding to the data type. The data type corresponds to the group identifier, that is, corresponds to a group indicated by the group identifier. Therefore, the policy information is applicable to one or more terminal devices included in the group. If another terminal device subsequently initiates registration, and the terminal device is also applicable to the policy information, the PCF may send the policy information to the terminal device without requesting to obtain data of a data type supported by the terminal device and generating policy information for the terminal device again. This simplifies an operation of the PCF, and reduces power consumption of the PCF. In addition, the PCF knows a correspondence between a group identifier and a data type. In other words, the PCF knows a data type, and can determine a corresponding UDR based on the data type. Therefore, the PCF may subscribe to updated data of a corresponding group from the UDR. If a terminal device in the group initiates registration again, the PCF may generate policy information of the terminal device based on the updated data of the group from the UDR without requesting the updated data from the UDR again. This simplifies an operation process of the PCF. In addition, in this embodiment of this application, the correspondence between the group identifier and the data type is stored in the UDR, so that storage space of the UDM can be saved.

Figure 12:
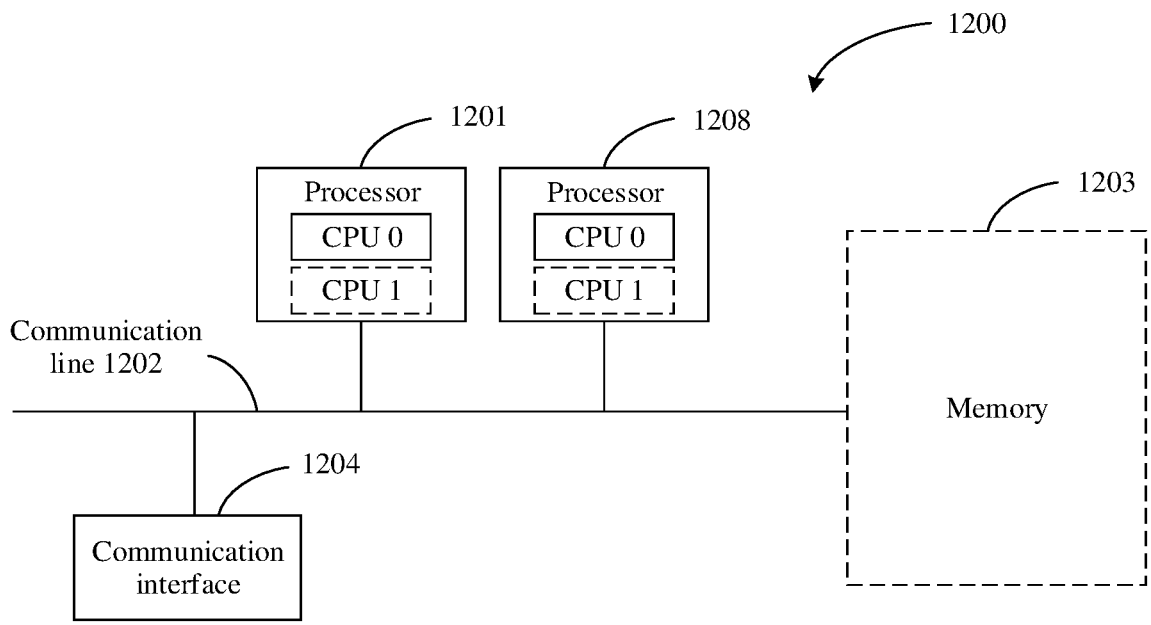
FIG. 12 is a schematic diagram of an apparatus according to an embodiment of this application.

Based on a same inventive concept, FIG. 12 is a schematic diagram of an apparatus according to this application. The apparatus may be a policy control network element 101, a first network element 102, or a chip. The first network element is, for example, a mobility management network element or a database storage network element, and may perform the method in any one of the foregoing embodiments. When the apparatus is the policy control network element 101 or the chip, the apparatus 1200 may be configured to perform an operation performed by the SMF in the embodiment shown in any one of FIG. 7 to FIG. 9. When the apparatus is a mobility management function network element or the chip, the apparatus 1200 may be configured to perform an operation performed by the PCF in the embodiment shown in any one of FIG. 8 to FIG. 11. When the apparatus is the mobility management network element or the chip, the apparatus 1200 may be configured to perform an operation performed by the AMF in the embodiment shown in any one of FIG. 8 to FIG. 11. When the apparatus is the database storage network element or the chip, the apparatus 1200 may be configured to perform an operation performed by the UDR in the embodiment shown in FIG. 11.

The apparatus 1200 includes at least one processor 1201, a communication line 1202, and at least one communication interface 1204. In an optional implementation, the apparatus 1200 may further include a memory 1203. Because the memory 1203 is not a functional module that needs to be included, but is only a functional module that can be optionally included, the memory 1203 is represented by a dotted box in FIG. 12.

The processor 1201 may include a general-purpose central processing unit (CPU), a microprocessor, an application-specific integrated circuit (ASIC), or one or more integrated circuits configured to control execution of programs in solutions in this application.

The communication line 1202 may include a path for transmitting information between the foregoing components.

The communication interface 1204 is any apparatus like a transceiver, and is configured to communicate with another device or a communication network, such as the ethernet, a radio access network (RAN), a wireless local area network (WLAN), or a wired access network.

The memory 1203 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer, but is not limited thereto. The memory 1203 may exist independently, and is connected to the processor 1201 through the communication line 1202. The memory 1203 may alternatively be integrated with the processor 1201.

The memory 1203 is configured to store computer-executable instructions for performing the solutions in this application, and execution of the computer-executable instructions is controlled by the processor 1201. The processor 1201 is configured to execute the computer-executable instructions stored in the memory 1203, to implement the communication method provided in the foregoing embodiments of this application.

Optionally, the computer-executable instructions in this embodiment of this application may also be referred to as application program code. This is not specifically limited in this embodiment of this application.

During specific implementation, in an embodiment, the processor 1201 may include one or more CPUs such as a CPU 0 and a CPU 1 in FIG. 12.

During specific implementation, in an embodiment, the apparatus 1200 may include a plurality of processors such as the processor 1201 and a processor 1208 in FIG. 12. Each of the processors may be a single-core (single-CPU) processor, or may be a multi-core (multi-CPU) processor. The processor herein may refer to one or more devices, circuits, and/or processing cores configured to process data (for example, computer program instructions).

When the apparatus shown in FIG. 12 is a chip, for example, may be a chip in the policy control network element 101 or a chip in the first network element 102, the chip includes the processor 1201 (and may further include the processor 1208), the communication line 1202, the memory 1203, and the communication interface 1204. Specifically, the communication interface 1204 may be an input interface, a pin, a circuit, or the like. The memory 1203 may be a register, a cache, or the like. The processor 1201 and the processor 1208 may each be a general-purpose CPU, a microprocessor, an ASIC, or one or more integrated circuits configured to control a program to perform the communication method in any one of the foregoing embodiments.

Figure 13:
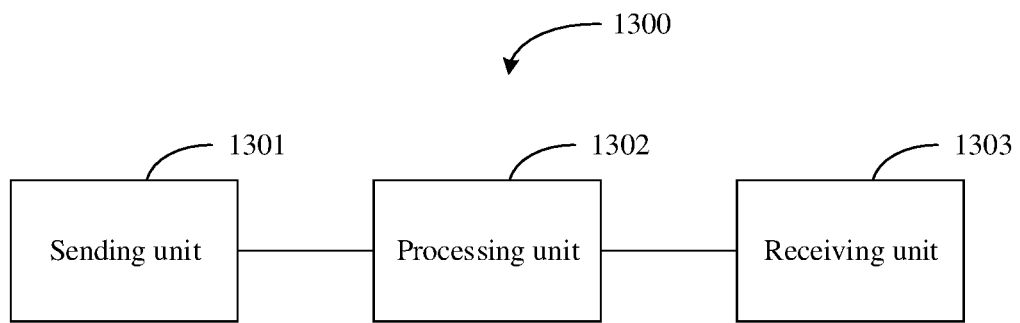
FIG. 13 is a schematic diagram of another apparatus according to an embodiment of this application.

In embodiments of this application, the apparatus may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example, and is merely logical function division. During actual implementation, another division manner may be used. For example, when each functional module is obtained through division based on each corresponding function, FIG. 13 is a schematic diagram of an apparatus. The apparatus 1300 may be the policy control network element 101 in the foregoing embodiments, the first network element 102 in the foregoing embodiments, a chip in the policy control network element 101, or a chip in the first network element. The apparatus 1300 includes a sending unit 1301, a processing unit 1302, and a receiving unit 1303.

In an embodiment, when the apparatus 1300 is the policy control network element 101 in the foregoing embodiments or the chip in the policy control network element 101,
 the receiving unit 1303 is configured to receive first information from a first network element 102, where the first information includes a group identifier and a data type corresponding to the group identifier, the group identifier indicates a group, and the group includes one or more terminal devices; and
 the processing unit 1302 is configured to obtain first data based on the first information, where the first data is data corresponding to the data type.

In an optional implementation, the first network element 102 is a mobility management network element, and the receiving unit 1303 is configured to receive the first information from the first network element 102 in the following manner:
 receiving the first information from the mobility management network element.

In an optional implementation, the first network element 102 is a database storage network element, and the receiving unit 1303 is configured to receive the first information from the first network element 102 in the following manner:
 receiving the first information from the database storage network element.

In an optional implementation, the sending unit 1301 is configured to send a first request message to the database storage network element, where the first request message requests to obtain subscription information of a first terminal device; and
 the receiving unit 1303 is configured to receive the first information from the database storage network element in the following manner:
 receiving the first information from the database network element, where the first terminal device belongs to the group.

In an optional implementation, the receiving unit 1303 is further configured to receive a UE policy association establishment request message of the first terminal device from a mobility management network element, where the UE policy association establishment request message requests to provide policy information for the first terminal device, and the UE policy association establishment request message further includes capability information of the first terminal device.

In an optional implementation, the receiving unit 1303 is configured to receive the first information from the database storage network element in the following manner:

receiving, from the database storage network element, the first information based on a first subscription request message, where the first subscription request message requests to subscribe to subscription information of a first terminal device, and the first information is updated subscription information of the first terminal device.

In an optional implementation, the processing unit 1302 is configured to obtain the first data based on the first information in the following manner:
   determining a database storage network element based on the data type;
   sending a second request message to the database storage network element through the sending unit 1301, where the second request message includes the group identifier, and the second request message requests to obtain the first data; and receiving the first data from the database storage network element through the receiving unit 1303.

In an optional implementation,
   the sending unit 1301 is further configured to send a second subscription request message to the database storage network element, where the second subscription request message requests to subscribe to an update notification of the first data; and
   the receiving unit 1303 is further configured to receive updated first data.

In an optional implementation, the processing unit 1302 is further configured to determine that the data corresponding to the data type is not stored.

In an optional implementation, the processing unit 1302 is further configured to determine, based on the capability information of the first terminal device, that the first terminal device supports use of the data corresponding to the data type.

In an optional implementation, the processing unit 1302 is configured to obtain the first data based on the first information in the following manner:
   determining that the first data is locally stored; and
   obtaining the first data locally.

In an optional implementation,
   the processing unit 1302 is further configured to generate policy information based on the first data; and
   the sending unit 1301 is further configured to send the policy information to the first terminal device.

In an optional implementation, the processing unit 1302 is configured to generate the policy information based on the first data in the following manner:
   determining, based on the capability information of the first terminal device, that the first terminal device supports use of the data corresponding to the data type; and
   generating the policy information based on the first data.

In another embodiment, when the apparatus 1300 is the mobility management network element in the foregoing embodiments or the chip in the mobility management network element,
   the sending unit 1301 is configured to send a third request message to a data management network element, where the third request message requests to obtain subscription information of a first terminal device;
   the receiving unit 1302 is further configured to receive second information from the data management network element, where the second information includes group identifiers and data types corresponding to the group identifiers, the group identifier indicates a group, and the group includes one or more terminal devices; and
   the sending unit 1301 is further configured to send first information to a policy control network element, where the first information is a subset of the second information.

In an optional implementation,
   the receiving unit 1303 is further configured to receive a registration request message from the first terminal device, where the registration request message includes capability information of the first terminal device; and
   the processing unit 1302 is further configured to determine the subset based on the capability information of the first terminal device.

In an optional implementation, the processing unit 1302 is configured to determine the subset based on the capability information of the first terminal device in the following manner:
   determining that the first terminal device supports a data type corresponding to the subset but does not support a data type corresponding to remaining information in the second information other than the subset; and/or
   determining that the policy control network element requires a data type corresponding to the subset but does not require a data type corresponding to remaining information in the second information other than the subset.

In an optional implementation, the third request message further includes the capability information of the first terminal device, and the capability information of the first terminal device is used to determine the second information.

It should be understood that the apparatus 1300 may be configured to implement steps performed by the policy control network element 101 or the mobility management network element in the method in embodiments of this application. For related features, refer to the foregoing descriptions. Details are not described herein again.

Specifically, functions/implementation processes of the sending unit 1301, the receiving unit 1303, and the processing unit 1302 in FIG. 13 may be implemented by the processor 1201 in FIG. 12 by invoking the computer-executable instructions stored in the memory 1203. Alternatively, functions/implementation processes of the processing unit 1302 in FIG. 13 may be implemented by the processor 1201 in FIG. 12 by invoking the computer-executable instructions stored in the memory 1203, and functions/implementation processes of the sending unit 1301 and the receiving unit 1303 in FIG. 13 may be implemented through the communication interface 1204 in FIG. 12.

Optionally, when the apparatus 1200 is a chip or a circuit, functions/implementation processes of the sending unit 1301 and the receiving unit 1303 may alternatively be implemented by a pin, a circuit, or the like. Optionally, when the apparatus 1200 is a chip, the memory 1203 may be a storage unit in the chip, for example, a register or a cache. Certainly, when the apparatus 1200 is the policy control network element 101, for example, the PCF in the foregoing embodiments, the memory 1203 may alternatively be a storage unit that is located outside a chip and that is in the policy control network element 101. This is not specifically limited in this embodiment of this application. When the apparatus 1200 is the first network element 102, the memory 1203 may alternatively be a storage unit that is located outside a chip and that is in the first network element 102. This is not specifically limited in this embodiment of this application.

All or a part of the foregoing embodiments may be implemented by using software, hardware, firmware, or any combination thereof. When software is used for implementation, all or a part of embodiments may be implemented in a form of a computer program product. The computer program product includes one or more computer instructions. When the computer program instructions are loaded and executed on a computer, all or a part of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

The various illustrative logical units and circuits described in embodiments of this application may implement or operate the described functions through a general-purpose processor, a digital signal processor (DSP), an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by using a combination of computing apparatuses, such as a digital signal processor and a microprocessor, a plurality of microprocessors, one or more microprocessors in combination with a digital signal processor core, or any other similar configuration.

Steps of the methods or algorithms described in embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to the processor, so that the processor can read information from the storage medium and write information to the storage medium. Optionally, the storage medium may alternatively be integrated into the processor. The processor and the storage medium may be arranged in the ASIC, and the ASIC may be arranged in a terminal device. Optionally, the processor and the storage medium may alternatively be arranged in different components of the terminal device.

The computer program instructions may alternatively be loaded onto a computer or another programmable data processing device, so that a series of operations and steps are performed on the computer or another programmable device, to generate computer-implemented processing. Therefore, the instructions executed on the computer or another programmable device provide steps for implementing a specified function in one or more procedures in the flowcharts and/or in one or more blocks in the block diagrams.

Although embodiments of this application are described with reference to specific features and embodiments thereof, it is clear that various modifications and combinations may be made to embodiments of this application without departing from the spirit and scope of embodiments of this application. Correspondingly, embodiments of this application and the accompanying drawings are merely example descriptions of embodiments of this application that are defined by the appended claims, and are considered to cover any or all of modifications, variations, combinations, or equivalents in the scope of embodiments of this application. It is clear that a person skilled in the art can make various modifications and variations to embodiments of this application without departing from the scope of embodiments of this application. Embodiments of this application are intended to cover these modifications and variations of embodiments of this application provided that they fall within the scope of protection defined by the claims of embodiments of this application and their equivalent technologies.

What is claimed is:

1. A method comprising:
   receiving, by a policy control network element, first information from a first network element, wherein the first information comprises a group identifier and a data type corresponding to the group identifier, the group identifier indicating a group and the group comprising one or more terminal devices; and
   obtaining, by the policy control network element, first data based on the first information, wherein the first data is data corresponding to the data type.

2. The method according to claim 1,
   wherein the first network element is a mobility management network element, and
   wherein receiving the first information from the first network element comprises receiving the first information from the mobility management network element.

3. The method according to claim 1,
   wherein the first network element is a data repository network element, and
   wherein receiving the first information from the first network element comprises receiving the first information from the data repository network element.

4. The method according to claim 3, wherein receiving the first information from the data repository network element comprises:
   sending a first request message to the data repository network element, wherein the first request message requests to obtain subscription information of a first terminal device, and
   receiving the first information from a database network element, wherein the first terminal device belongs to the group.

5. The method according to claim 3, wherein receiving the first information from the data repository network element comprises receiving, from the data repository network element, the first information based on a first subscription request message, wherein the first subscription request message requests to subscribe to an update notification of subscription information of a first terminal device, and wherein the first information is updated subscription information of the first terminal device.

6. The method according to claim 1, wherein obtaining the first data based on the first information comprises:

determining a data repository network element based on the data type, sending a second request message to the data repository network element, wherein the second request message comprises the group identifier, and the second request message requests to obtain the first data, and receiving the first data from the data repository network element.

7. The method according to claim 6, further comprising determining, by the policy control network element based on capability information of a first terminal device, that the first terminal device supports using the data corresponding to the data type.

8. The method according to claim 1, wherein obtaining the first data based on the first information comprises:

determining that the first data is locally stored, and obtaining the first data locally.

9. The method according to claim 1, further comprising:

sending, by the first network element, a third request message to a data management network element, wherein the third request message requests to obtain subscription information of a first terminal device;

receiving, by the first network element, second information from the data management network element, wherein the second information comprises group identifiers and data types corresponding to the group identifiers, the group identifier indicating the group and the group comprising the one or more terminal devices; and sending, by the first network element, the first information to the policy control network element, wherein the first information is a subset of the second information.

10. The method according to claim 9, further comprising:

receiving, by the first network element, a registration request message from the first terminal device, wherein the registration request message comprises capability information of the first terminal device; and determining, by the first network element, the subset based on the capability information of the first terminal device.

11. The method according to claim 9, wherein the third request message further comprises capability information of the first terminal device, and wherein the capability information of the first terminal device is used to determine the second information.

12. A communication apparatus comprising:

at least one processor; and at least one non-transitory computer readable medium coupled to the at least one processor and storing programming instructions for execution by the at least one processor, the programming instructions include instructions for:

receiving first information from a first network element, wherein the first information comprises a group identifier and a data type corresponding to the group identifier, the group identifier indicating a group and the group comprising one or more terminal devices; and obtaining first data based on the first information, wherein the first data is data corresponding to the data type.

13. The communication apparatus according to claim 12, wherein the first network element is a mobility management network element, and wherein the instructions for receiving the first information from the first network element comprises instructions for receiving the first information from the mobility management network element.

14. The communication apparatus according to claim 12, wherein the first network element is a data repository network element, and wherein the instructions for receiving the first information from the first network element comprises instructions for receiving the first information from the data repository network element.

15. The communication apparatus according to claim 14, wherein the instructions for receiving the first information from the data repository network element comprises instructions for:

sending a first request message to the data repository network element, wherein the first request message requests to obtain subscription information of a first terminal device, and receiving the first information from a database network element, wherein the first terminal device belongs to the group.

16. The communication apparatus according to claim 14, wherein the instructions for receiving the first information from the data repository network element comprises instructions for receiving, from the data repository network element, the first information based on a first subscription request message, wherein the first subscription request message requests to subscribe to an update notification of subscription information of a first terminal device, and wherein the first information is updated subscription information of the first terminal device.

17. The communication apparatus according to claim 12, wherein the instructions for obtaining the first data based on the first information comprises instructions for:

determining a data repository network element based on the data type, sending a second request message to the data repository network element, wherein the second request message comprises the group identifier, and the second request message requests to obtain the first data, and receiving the first data from the data repository network element.

18. The communication apparatus according to claim 12, wherein the instructions for obtaining the first data based on the first information comprises instructions for:

determining that the first data is locally stored, and obtaining the first data locally.

19. A communication system comprising:

a policy control network element; and a first network element configured to send first information to the policy control network element, wherein the first information comprises a group identifier and a data type corresponding to the group identifier, the group identifier indicating a group and the group comprising one or more terminal devices, and wherein the policy control network element is configured to:

receive the first information from the first network element, and obtain first data based on the first information, the first data being data corresponding to the data type.

20. The communication system according to claim 19, wherein the first network element is a mobility management network element, and wherein the mobility management network element is further configured to:

send a third request message to a data management network element, the third request message requesting to obtain subscription information of a first terminal device, and receive second information from the data management network element, the second information comprising group identifiers and corresponding data types, and the first information being a subset of the second information.

21. The communication system according to claim 20, further comprising:
a data repository network element configured to store the data corresponding to the data type,
wherein the policy control network element is configured to obtain the first data based on the first information by:
determining the data repository network element based on the data type,
sending a second request message to the data repository network element and receiving the first data from the data repository network element, wherein the second request message comprises the group identifier and the second request message requests to obtain the first data.

22. The communication system according to claim 19,
wherein the first network element is a data repository network element, and
wherein the policy control network element is further configured to:
send a first request message to the data repository network element, wherein the first request message requests to obtain subscription information of a first terminal device; and
receive the first information from a database network element, wherein the first terminal device belongs to the group.

* * * * *